United States Patent
Koelling et al.

(10) Patent No.: US 11,204,052 B2
(45) Date of Patent: *Dec. 21, 2021

(54) CLIP LOCK FASTENERS AND FASTENING SYSTEM

(71) Applicant: Lockdowel, Inc., Fremont, CA (US)

(72) Inventors: Fred Koelling, Foster City, CA (US); Bryan Koelling, Carmel Valley, CA (US); Daniel Savage, San Mateo, CA (US)

(73) Assignee: LOCKDOWEL, INC., Fremont, CA (US)

(*) Notice: Subject to any disclaimer, the term of this patent is extended or adjusted under 35 U.S.C. 154(b) by 663 days.

This patent is subject to a terminal disclaimer.

(21) Appl. No.: 15/802,288

(22) Filed: Nov. 2, 2017

(65) Prior Publication Data

US 2018/0051734 A1    Feb. 22, 2018

Related U.S. Application Data

(63) Continuation of application No. 15/215,508, filed on Jul. 20, 2016, now Pat. No. 9,810,253.

(Continued)

(51) Int. Cl.
*F16B 12/20* (2006.01)
*F16B 12/26* (2006.01)
(Continued)

(52) U.S. Cl.
CPC ............ *F16B 12/20* (2013.01); *A47B 47/04* (2013.01); *F16B 12/22* (2013.01); *F16B 12/24* (2013.01); *F16B 12/26* (2013.01)

(58) Field of Classification Search
CPC .......... F16B 12/20; F16B 12/22; F16B 12/24; F16B 12/26; Y10T 403/4634;
(Continued)

(56) References Cited

U.S. PATENT DOCUMENTS 376,881 A    1/1888 Haish
979,853 A    12/1910 Hartshorn
(Continued)

FOREIGN PATENT DOCUMENTS

CA    2280528 A1    4/2000
CA    2986912    11/2017
(Continued)

OTHER PUBLICATIONS

International Search Report, dated Nov. 29, 2016, for corresponding International Application No. PCT/US2016/043206.

(Continued)

*Primary Examiner* — Jonathan P Masinick
(74) *Attorney, Agent, or Firm* — Kilpatrick Townsend & Stockton LLP

(57) ABSTRACT

A friction fit clip fastening system that creates a firm and invisible connection between panels or substrates without the use of tools or glue, comprising a fastener and mating rout. The fastener has a clip element that allows it to clip and connect to a mating rout. Different routs are used for different embodiments of the fasteners. The rout is formed directly in the panel face or edge or formed on a substrate by a router bit that has three cutting edges. The connections made by the friction fit clip fastening system are invisible. The fasteners can be installed at the manufacturing site so the user simply clips or slides the fasteners into the appropriate slot or rout when assembling. The friction fit fastening system is easily removable from the panels making assembling and disassembling quick and easy because the fastener is made of one piece. The friction fit clip fastening system can also be permanent if the permanent rout is used.

20 Claims, 14 Drawing Sheets

Related U.S. Application Data

(60) Provisional application No. 62/245,211, filed on Oct. 22, 2015, provisional application No. 62/194,794, filed on Jul. 20, 2015.

(51) Int. Cl.
- *A47B 47/04* (2006.01)
- *F16B 12/22* (2006.01)
- *F16B 12/24* (2006.01)

(58) Field of Classification Search
CPC ........... Y10T 403/4694; Y10T 403/587; A47B 47/04; A47B 47/042
See application file for complete search history.

(56) References Cited

U.S. PATENT DOCUMENTS

| | | |
|---|---|---|
| 1,537,678 A | 5/1925 | Jensen |
| 1,936,733 A | 11/1933 | Richardson |
| 2,225,612 A | 12/1940 | Allen |
| 2,132,647 A | 1/1946 | Robins |
| 2,392,551 A | 1/1946 | Roe |
| 2,735,146 A | 2/1956 | Purviance |
| 3,261,493 A | 7/1966 | Smith |
| 3,310,327 A | 3/1967 | Tremblay |
| 3,314,551 A | 4/1967 | Plastow |
| 3,336,689 A | 8/1967 | Miller |
| 3,674,068 A | 7/1972 | Lucci |
| 3,752,553 A | 8/1973 | Bildahl |
| 3,857,619 A | 12/1974 | Adickes |
| 3,883,258 A | 5/1975 | Hewson |
| 3,894,377 A | 7/1975 | Welch |
| 3,896,743 A | 7/1975 | Pariente |
| 3,979,796 A | 9/1976 | MacDonald |
| 4,025,216 A | 5/1977 | Hives |
| 4,032,241 A | 6/1977 | Martin |
| 4,189,861 A | 2/1980 | Fischer |
| 4,199,907 A | 4/1980 | Bains |
| 4,232,724 A | 11/1980 | Brown |
| 4,258,464 A | 3/1981 | Ullman |
| 4,292,003 A | 9/1981 | Pond |
| 4,332,205 A | 6/1982 | Corl |
| 4,383,397 A | 5/1983 | Ward |
| 4,391,077 A | 7/1983 | Giess |
| 4,402,117 A | 9/1983 | Kitagawa |
| 4,566,211 A | 1/1986 | Gustafson |
| 4,610,560 A | 9/1986 | Miller |
| 4,634,309 A | 1/1987 | Dewey |
| 4,645,374 A | 2/1987 | Erickson |
| 4,676,038 A | 6/1987 | Doyon |
| 4,701,066 A | 10/1987 | Beam |
| D294,676 S | 3/1988 | Egner et al. |
| 4,795,116 A | 1/1989 | Kohut |
| 4,846,538 A | 7/1989 | Roeck et al. |
| 4,874,212 A | 10/1989 | Roeck et al. |
| 4,902,080 A | 2/1990 | Berger |
| 4,922,678 A | 5/1990 | Scheiwiller |
| 4,932,105 A | 6/1990 | Muller |
| 4,942,709 A | 7/1990 | Waldron |
| D309,985 S | 8/1990 | Cox |
| 4,977,696 A | 12/1990 | Johansson |
| 5,090,835 A * | 2/1992 | Cox ........................ A47G 1/102 403/294 |
| 5,149,236 A | 9/1992 | Rapayelian |
| 5,150,865 A | 9/1992 | Miller |
| 5,251,996 A | 10/1993 | Hiller et al. |
| RE34,738 E | 9/1994 | Brady |
| 5,360,128 A | 11/1994 | Hessenthaler |
| 5,380,119 A | 1/1995 | Hadden |
| D356,729 S | 3/1995 | Kassouni |
| 5,407,310 A | 4/1995 | Kassouni |
| 5,430,983 A | 7/1995 | Taipalensuu |
| D377,601 S | 1/1997 | Kozyrski |
| 5,611,637 A | 3/1997 | Brustle et al. |
| 5,636,934 A | 6/1997 | Nakanishi et al. |
| D384,271 S | 9/1997 | Kozyrski |
| 5,676,486 A | 10/1997 | Kieth |
| 5,704,699 A | 1/1998 | Pagelow |
| 5,895,103 A | 4/1999 | Huber |
| 5,934,486 A | 8/1999 | Jarvis |
| 6,000,186 A | 12/1999 | Fielding |
| 6,141,837 A | 11/2000 | Wisniewski |
| 6,186,698 B1 | 2/2001 | Knapp |
| 6,189,282 B1 | 2/2001 | VanderWerf |
| 6,234,596 B1 | 5/2001 | Egger |
| 6,389,742 B1 | 5/2002 | Wuster |
| 6,761,008 B2 | 7/2004 | Chen et al. |
| 7,178,886 B2 | 2/2007 | Hightower |
| 7,207,636 B2 | 4/2007 | Livingston |
| 7,225,751 B2 | 6/2007 | Rueckert |
| 7,444,792 B2 | 11/2008 | Matson |
| 8,104,989 B2 | 1/2012 | Liu et al. |
| 8,147,162 B1 | 4/2012 | Burnett |
| 8,206,054 B1 | 6/2012 | Burnett |
| 8,291,594 B2 | 10/2012 | Etling |
| 8,549,796 B2 | 10/2013 | Heather |
| 8,608,407 B1 | 12/2013 | Vaughn et al. |
| 8,641,315 B2 | 2/2014 | Liu et al. |
| 8,707,648 B2 | 4/2014 | Timko |
| 8,821,594 B2 | 9/2014 | Burgazli et al. |
| 9,051,953 B2 | 6/2015 | Imel et al. |
| 9,377,042 B2 | 6/2016 | De Wilde |
| 9,644,653 B2 | 5/2017 | Reiter |
| 9,714,673 B2 | 7/2017 | Phillips |
| 9,826,828 B1 | 11/2017 | Vaughan |
| D820,073 S | 6/2018 | Iacono |
| 10,113,575 B2 | 10/2018 | Baur et al. |
| 10,136,726 B2 | 11/2018 | Stack |
| 10,138,917 B2 | 11/2018 | Koch |
| 10,197,081 B2 | 2/2019 | Koelling |
| 10,202,777 B1 | 2/2019 | Leavey |
| D857,487 S | 8/2019 | Thompson |
| D859,134 S | 9/2019 | Iacono |
| D883,778 S | 5/2020 | Koelling et al. |
| D883,779 S | 5/2020 | Koelling et al. |
| D885,171 S | 5/2020 | Koelling et al. |
| 10,702,061 B2 | 7/2020 | Stack |
| 10,786,076 B2 | 9/2020 | Stack |
| D909,190 S | 2/2021 | Koelling et al. |
| D909,191 S | 2/2021 | Koelling et al. |
| D909,192 S | 2/2021 | Koelling et al. |
| 2003/0026651 A1 | 2/2003 | Ley |
| 2004/0067098 A1 | 4/2004 | Sun |
| 2004/0155562 A1 | 8/2004 | Saravis |
| 2004/0195122 A1 | 10/2004 | Awaji |
| 2004/0223805 A1 | 11/2004 | Benedetti et al. |
| 2005/0097851 A1 | 5/2005 | Lubera et al. |
| 2006/0174579 A1 | 8/2006 | Matson |
| 2008/0042532 A1 | 2/2008 | Crabtree |
| 2008/0069631 A1 | 3/2008 | Zillmann |
| 2008/0159806 A1 | 7/2008 | Niswonger |
| 2009/0026163 A1 | 1/2009 | Lee |
| 2009/0151616 A1 | 6/2009 | Han |
| 2009/0241460 A1 | 10/2009 | Beaulieu |
| 2010/0003077 A1 | 1/2010 | Kelley |
| 2010/0079045 A1 | 4/2010 | Yeh |
| 2010/0254757 A1 | 10/2010 | Saul |
| 2011/0085853 A1 | 4/2011 | Liu |
| 2011/0255915 A1* | 10/2011 | Chen .................... F16B 12/125 403/381 |
| 2011/0286792 A1 | 11/2011 | Henriott |
| 2011/0302865 A1 | 12/2011 | Kliegle |
| 2012/0301217 A1 | 11/2012 | Liu et al. |
| 2012/0321378 A1 | 12/2012 | Velez et al. |
| 2013/0239509 A1 | 9/2013 | Wang |
| 2013/0257243 A1 | 10/2013 | Bader |
| 2013/0287484 A1 | 10/2013 | Phillips |
| 2014/0030475 A1 | 1/2014 | MacInnes |
| 2014/0150368 A1 | 6/2014 | MacDonald |
| 2014/0294498 A1 | 10/2014 | Logan |
| 2015/0003919 A1 | 1/2015 | Imel |
| 2015/0147113 A1 | 5/2015 | Crabtree |
| 2015/0219137 A1 | 8/2015 | Koelling |

(56) References Cited

U.S. PATENT DOCUMENTS

| | | |
|---|---|---|
| 2015/0354612 A1 | 12/2015 | Koch |
| 2015/0368896 A1 | 12/2015 | Schulte |
| 2017/0023041 A1 | 1/2017 | Koelling et al. |
| 2017/0023043 A1 | 1/2017 | Koelling et al. |
| 2017/0159291 A1 | 6/2017 | Derelov |
| 2017/0321734 A1 | 11/2017 | Maertens |
| 2018/0031019 A1 | 2/2018 | Sjostedt et al. |
| 2018/0092460 A1 | 4/2018 | Stack |
| 2018/0094664 A1 | 4/2018 | Lai |
| 2018/0220798 A1 | 8/2018 | Koelling et al. |
| 2018/0249828 A1 | 9/2018 | Stack |
| 2019/0003505 A1 | 1/2019 | Cattaneo |
| 2019/0053619 A1 | 2/2019 | Stack |
| 2019/0166990 A1 | 6/2019 | Stack |
| 2019/0211859 A1 | 7/2019 | Liu et al. |
| 2019/0242420 A1 | 8/2019 | Dietrich |

FOREIGN PATENT DOCUMENTS

| | | |
|---|---|---|
| CN | 1100782 | 3/1995 |
| CN | 103216505 A | 7/2013 |
| CN | 103541968 | 1/2014 |
| CN | 203685798 | 7/2014 |
| DE | 1914089 | 10/1970 |
| DE | 295 11 055 | 2/1996 |
| DE | 2006004125 U1 | 6/2006 |
| DE | 202006004125 | 6/2006 |
| DE | 2009008093 | 10/2009 |
| DE | 102011014152 A1 | 9/2012 |
| DE | 10 2011 122 697 | 6/2013 |
| DE | 2014100089 U1 | 5/2015 |
| EP | 2016727582 | 5/2016 |
| EP | 3078864 | 10/2016 |
| FR | 438441 | 5/1912 |
| FR | 2590943 | 6/1987 |
| GB | 2064699 | 6/1981 |
| JP | 50126547 | 10/1975 |
| TW | 201441490 A | 11/2014 |
| WO | WO 2014146979 A1 | 9/2014 |
| WO | WO 2015158622 A1 | 10/2015 |
| WO | WO 2016/133455 A1 | 8/2016 |
| WO | 2016187533 | 11/2016 |

OTHER PUBLICATIONS

Written Opinion of the International Searching Authority, dated Nov. 29, 2016, for corresponding International Application No. PCT/US2016/043206.
U.S. Appl. No. 29/734,146, Notice of Allowance, dated Aug. 24, 2020, 7 pages.
U.S. Appl. No. 29/734,147, Notice of Allowance, dated Aug. 24, 2020, 7 pages.
U.S. Appl. No. 29/734,148, Notice of Allowance, dated Aug. 24, 2020, 7 pages.
Chinese Application No. CN201610338555.6, Office Action, dated Sep. 21, 2020, 7 pages.
Taiwan Application No. TW105122893, Office Action, dated Jul. 3, 2020, 7 pages.
Taiwan Application No. TW105122896, Office Action, dated Jul. 3, 2020, 7 pages.
U.S. Appl. No. 62/164,340, filed May 20, 2015.
U.S. Appl. No. 29/734,146, "Supplemental Notice of Allowability", dated Jan. 6, 2021, 4 pages.
U.S. Appl. No. 29/734,147, "Supplemental Notice of Allowability", dated Jan. 6, 2021, 4 pages.
U.S. Appl. No. 29/734,148, "Supplemental Notice of Allowability", dated Jan. 6, 2021, 4 pages.
TW105122893, "Notice of Decision to Grant", dated Nov. 24, 2020, 2 pages.
PCT/US2016/033518, International Search Report and Written Opinion, dated Nov. 24, 2016.
PCT/US2016/033518, International Preliminary Report on Patentability, dated Nov. 21, 2017.
U.S. Appl. No. 15/215,506, Final Office Action dated Aug. 28, 2017, 11 pages.
U.S. Appl. No. 15/215,506, Final Office Action dated Jul. 5, 2018, 9 pages.
U.S. Appl. No. 15/215,506, Non-Final Office Action dated May 11, 2017, 10 pages.
U.S. Appl. No. 15/215,506, Non-Final Office Action dated Dec. 15, 2017, 11 pages.
U.S. Appl. No. 15/215,506, Notice of Allowance dated Nov. 15, 2018, 7 pages.
U.S. Appl. No. 15/215,506, Supplemental Notice of Allowability dated Jan. 2, 2019, 2 pages.
U.S. Appl. No. 15/215,508, Non-Final Office Action dated Feb. 8, 2017, 12 pages.
U.S. Appl. No. 15/215,508, Notice of Allowance dated Jul. 3, 2017, 9 pages.
U.S. Appl. No. 15/215,508, Supplemental Notice of Allowability dated Aug. 14, 2017, 2 pages.
U.S. Appl. No. 29/698,854, Notice of Allowance dated Jan. 14, 2020, 7 pages.
U.S. Appl. No. 29/698,855, Notice of Allowance dated Jan. 28, 2020, 7 pages.
U.S. Appl. No. 29/698,856, Notice of Allowance dated Jan. 10, 2020, 7 pages.
Chinese Application No. 201610338555.6, Office Action dated Mar. 31, 2020, 8 pages.
Chinese Application No. 201610338555.6, Office Action dated May 5, 2019, 9 pages.
Chinese Application No. 201811620631.8, Office Action dated Oct. 23, 2019, 5 pages.
International Application No. PCT/US2016/043205, International Search Report and Written Opinion dated Nov. 28, 2016, 12 pages.

\* cited by examiner

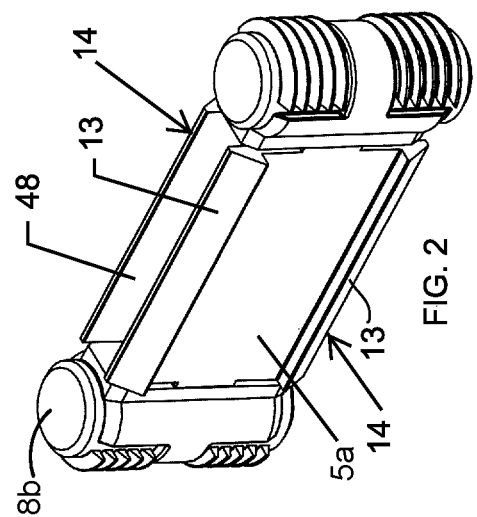
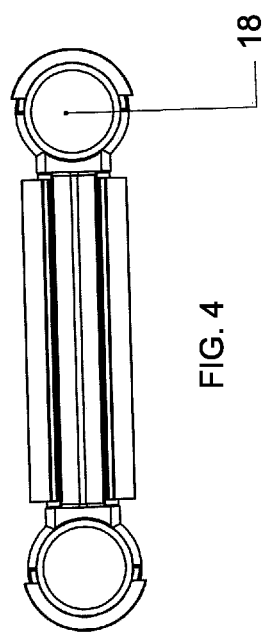
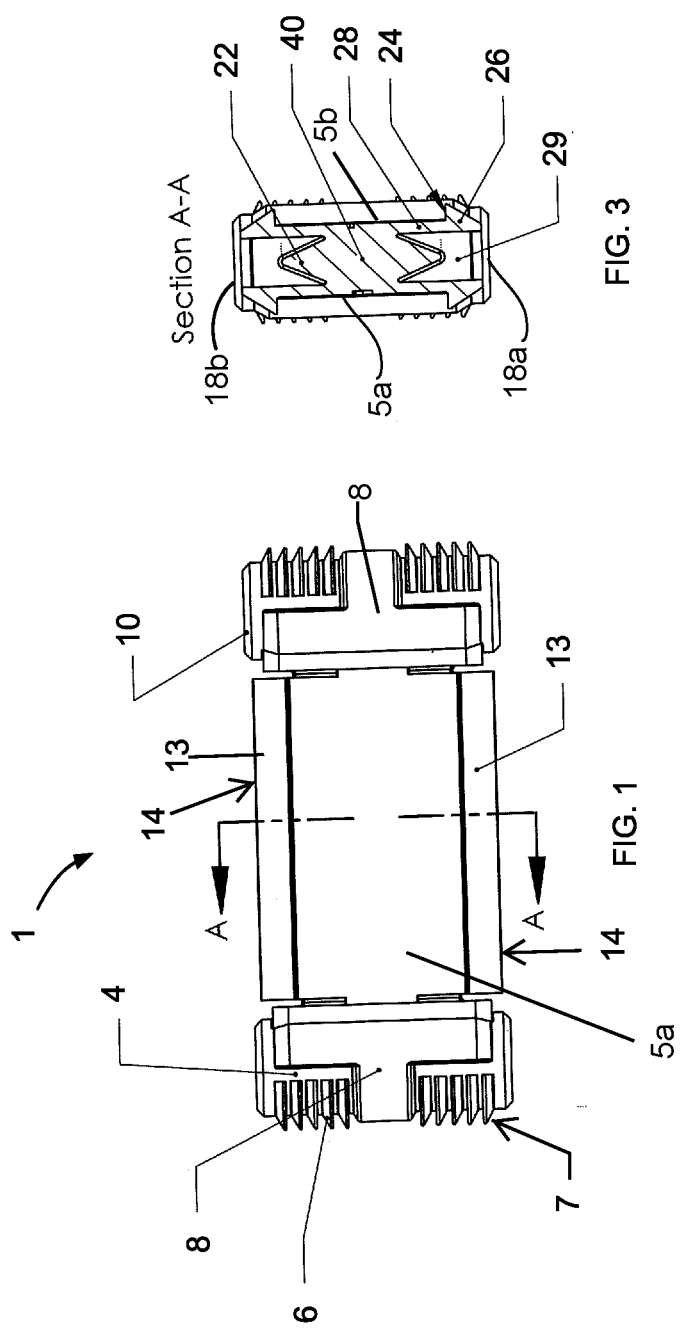

SECTION A-A

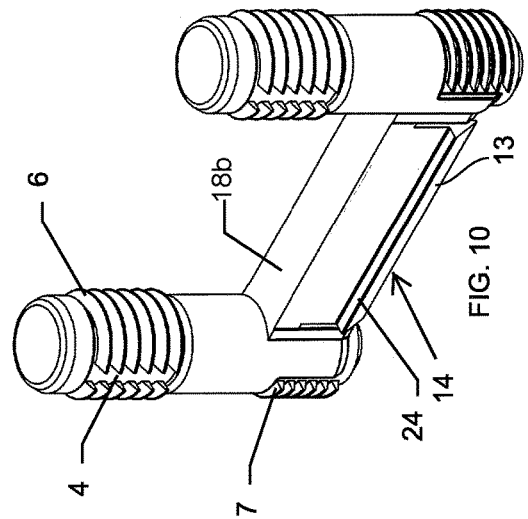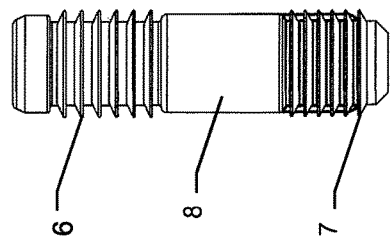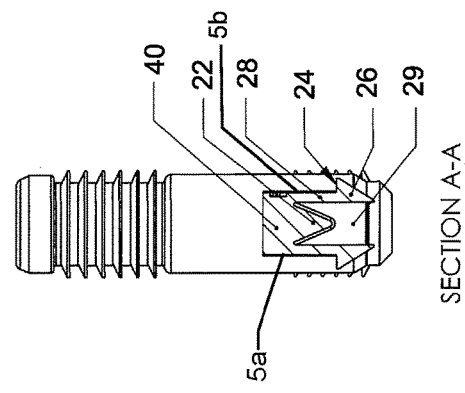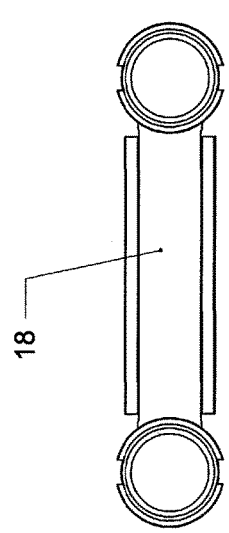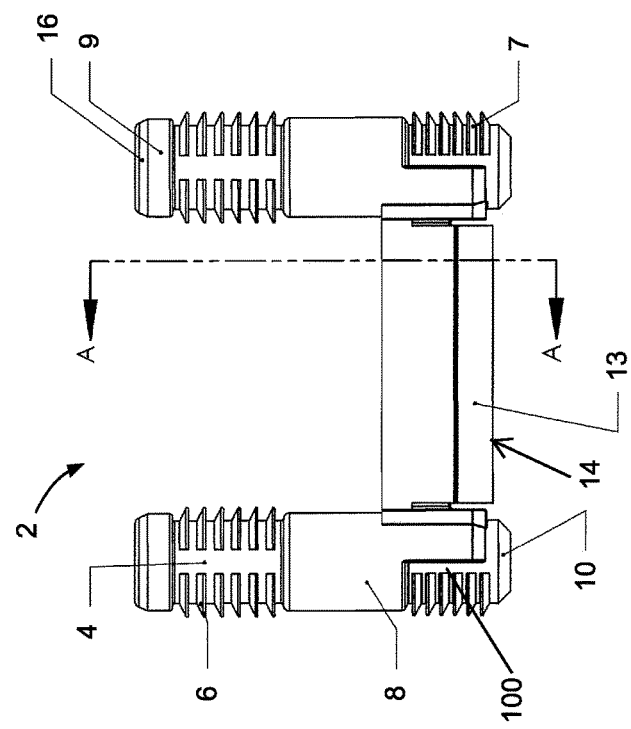

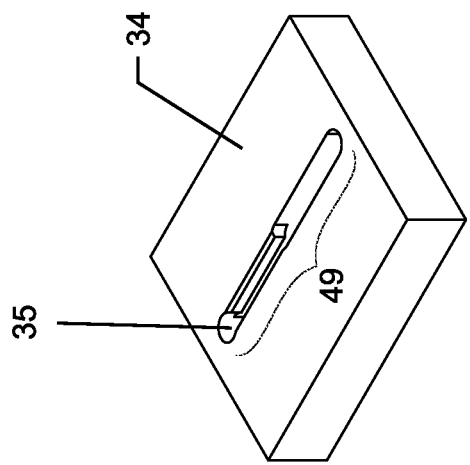
FIG. 31
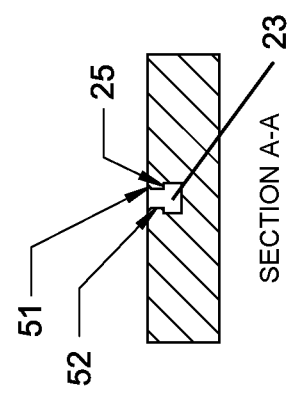
FIG. 33 SECTION A-A
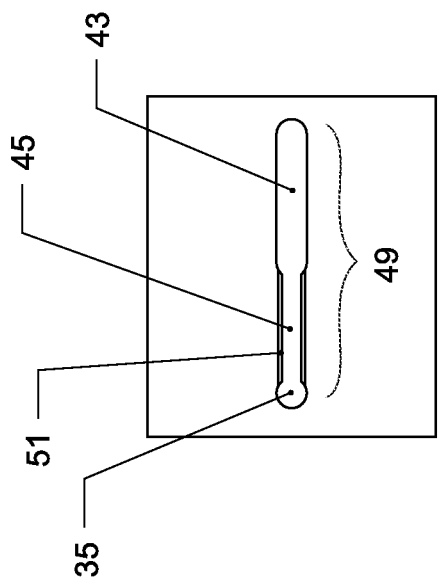
FIG. 30
FIG. 32

CLIP LOCK FASTENERS AND FASTENING SYSTEM

CROSS-REFERENCE TO RELATED APPLICATION

This application is a continuation of co-pending U.S. application Ser. No. 15/215,508, filed Jul. 20, 2016 and claims the benefit of U.S. Provisional Application No. 62/194,794, filed Jul. 20, 2015 and U.S. Provisional Application No. 62/245,211, filed Oct. 22, 2015, each of which is hereby incorporated by reference in its entirety.

BACKGROUND OF THE INVENTION

1. Field of Invention

This invention relates to fasteners and routs; more particularly, to tool-less fastening systems for furniture, cabinets, fixtures, wood, plastic, metal, and a variety of substrates. It also pertains to fasteners that use, in one format or another, a tight friction fit or snap fit as the pertinent fastening element.

2. Background

Increased commercialization of ready to assemble ("RTA") furniture and the requirement to assemble cabinets, store fixtures, and many other wood and plastic products, faster, easier and at the point of sale is driving the requirement to develop fastening systems capable of these attributes. Additionally, the increasing cost of transportation has driven case good furniture manufacturers to develop a means of shipping their products in a more condensed manner so as to reduce total cargo volume. The problem is there is no cost effective way to quickly assembly the product after shipping that is simple, sturdy, tool-less and invisible after assembly has been or is currently available in the market. While many attempts have been made to develop fasteners for this purpose, none have been commercially successful in meeting all these characteristics.

For many years the only available products used to join wood parts together were nails, glue, screws, nuts and bolts. All of these fasteners were used primarily in the furniture or cabinet manufacturing plant for assembly of their products. Furniture, cabinets, and other wood products were preassembled at the factory and delivered to the store for purchase. The first products were of simple construction and were shipped with instructions on how to screw and glue them together. As the demand for less expensive ready to assemble furniture gained in popularity the first product to make it easier to assemble was the cam-lock. A cam-lock fastener is comprised of a metal pin that screwed into the face of the board and a round metallic female component that was placed in a hole close to the edge of the opposing wood panel. The metal pin is screwed into the opposing panel face and then inserted into the opposing hole where the cam housing is located. The head on the metal pin is engaged in a circular style cam. The cam has a location for a screw driver to turn it clockwise thus connecting the pin head to the cam and turning it such that the two panels are drawn together. The female housing containing the cam element has a small indent or cleat to catch the pin and keep it from backing out and coming loose.

While cam-locks are now ubiquitous in the wood working environment and have helped the industry to further develop products that can be mass produced and shipped flat packed they have serious limitations.

The first limitation is realized during installation when a bag full of hardware to include cam-locks and other fasteners and hardware arrive with the product. The time, complications and instructions required for many people to understand how to use these products can be significant. Many people, even though experienced and skilled in using these products can take hours in putting the final product together. Cam-locks and other fasteners currently available in the market cannot be preinstalled by the manufacturer which further complicates this process and adds considerable time for the consumer or professional installer to complete the assembly.

Another important issue is that cam-locks and screws come loose, even falling out in many cases after the assembly is completed. The assembled furniture or cabinet then begins to wobble and eventually comes completely loose or falls out. This problem is well known in the industry and necessitates most cam lock assembled furniture to be tightened up periodically to keep this from happening.

The third issue is with visibility. Furniture and cabinet manufacturers many times try to hide the fastener from visibility after assembly but this is very difficult to do in most cases. When fastener systems are visible after assembly the assumed value of the furniture is considerably less as it is both unsightly but also certifies that it was not assembled in a professionally equipped factory.

Following the invention of the cam-lock there have been several attempts to patent fastener devices that would compete with or improve on the cam-lock device. Most have failed for one reason or another. One of the common causes for failure is the impracticality of successfully installing the product using high speed commercially available machines.

As such, there is a need for a fastener which allows wood and plastic cabinet and furniture products to be flat packed and to be assembled 4 to 5 times faster than with other fastener systems currently available. Additionally the fasteners allow the manufacturer to pre-install the fasteners so there is no "bag" of hardware. The assembly only requires that the pre-installed fasteners connects to the slot in the wood and either slides or pushes the panels together. There is no need for any tools required or hours of frustration reading many pages of instructions. This new fastener results in a sturdy piece of furniture or cabinet with all fastener locations being invisible after assembly. Of considerable importance is that the fasteners remain tightly held in place and never require periodic tightening to keep the furniture or cabinet from becoming wobbly or loosening up. Of additional importance is that the fastener is extremely economical both in its method of manufacture and in its application or insertion into the wood panels. The panels only require the use of conventional wood working tools to install. Factories or woodworking shops with the ability to drill holes in the edge of a panel and to machine or router slots in the face of a panel can easily and successfully install these fasteners.

SUMMARY

These features, advantages and other embodiments of the present invention are further made apparent, in the remainder of the present document, to those of ordinary skill in the art.

According to an embodiment of the present invention, there is a fastener comprising: a body, a center support section and at least a first pair of compressible clips formed on the center support section. The body having a first surface opposing a parallel second surface, a first face opposing a parallel second face, the first and second faces perpendicular to the first and second surfaces, each of the first and second surfaces terminating at a first end member and an opposing second end member. The center support section is located between the first end member and the second end member; and wherein one clip protrudes from the first surface and an opposing clip protrudes from the second surface, and the pair of clips located an equal distance away from the first face. The body may further comprise a second pair of compressible clips located an equal distance away from the second face, opposing the first pair of compressible clips. In further embodiments, each clip comprises a hook having a triangular profile along its cross-section. Each clip protrudes away from the center support with a flat surface (a hook undercut) parallel to a face and with an inclined surface (flange) tapering toward the face.

In other embodiments of the present invention, the center support section of the fastener body further comprises an internal deflection space between the pair of compressible clips. In another embodiment, the deflection space flares out toward a respective face. The deflection space is bounded by a cantilever arm formed on the first surface side and the second surface side, the cantilever arms deflect into the deflection space when pressure is applied to the compressible clips. Two or more pairs of compressible clips may be formed on a fastener, opposing each other and/or along a same elevation, and may be divided by a center post on the center support section. In yet further embodiments of the present invention, the first and second end members may extend out perpendicularly from the second face a distance past the center support section to form a pair of posts. A portion of the outer surface of each end member or of each post may include a plurality of barbed edges. In addition, one or more of the faces of the body, including the terminating end of one or more end members or posts, may include chamfered edges.

According to another embodiment of the present invention, there is a fastening system comprising: a fastener body and a slot formed into a surface of a substrate. The fastener body comprises a first surface opposing a parallel second surface, a first face opposing a parallel second face, the first and second faces perpendicular to the first and second surfaces, each of the first and second surfaces terminating at a first end member and an opposing second end member. The fastener body further comprises a center support section located between the first end member and the second end member; and at least a first pair of compressible clips formed on the center support section, wherein one clip protrudes from the first surface and an opposing clip protrudes from the second surface, and the pair of clips located an equal distance away from the first face. The slot of the fastening system comprises: a first end, a second end, and a depth configured with at least two slot/depth sections of different widths to correspondingly receive the compressible clips of the fastener, such that the clips compress when initially inserted into the slot through a first slot/depth section and then the clips expand to lock the fastener in place when received into a second slot/depth section. In further embodiments of the present invention, the width of the first slot/depth section transitions at a substantially right angle to the width of the second slot/depth section on opposing sides of the slot, forming an undercut surface to engage the pair of clips when received into the second slot/depth section. In another embodiment, the depth of the slot may further comprise a third slot/depth section defining an insertion chamfer for initially receiving the fastener at chamfered edges of the first face of the fastener body.

In yet another embodiment, the slot of the fastening system is formed as a double slot comprising: an insertion slot beginning from the first end and continuing into a keyway slot terminating at the second end; a width of the insertion slot being larger than a width of the keyway slot and configured to receive at least the first face of the fastener. The at least two slot/depth sections are located within the keyway slot such that the keyway slot slidingly receives the fastener from the insertion slot or slidingly releases the fastener back into the insertion slot.

In a further embodiment of the present invention, there is a slot formed into a surface of a substrate and configured to receive a mating fastener body, the slot comprising: a first end, an opposing second end, and a depth configured with at least a first depth section and a second depth section of different widths. The second depth section is located deeper in depth than the first depth section; and a width of the first depth section transitions to a larger width of the second depth section. In an embodiment, the width of the first depth section transitions at a right angle to a larger width of the second depth section. In another embodiment, the slot further comprises an insertion groove beginning from the first end and continuing into a keyway groove terminating at the second end; a width of the insertion groove being larger than a width of the keyway groove and the at least first depth section and second depth section are located within the keyway groove; and the insertion groove and keyway groove each having a length to entirely receive a length of the fastener body. The slot may further comprise a chamfered insertion edge beginning from the surface of the substrate and leading into the first depth section. The keyway groove may further be substantially T-slotted. In another embodiment, the slot further comprises a pair of insertion holes, one insertion hole on the first end and another insertion hole on the second end, the diameter of the insertion holes being larger than a width of the first depth section.

In other embodiments of the present invention, the fastener comprises a symmetrically formed solid body. In embodiments, the body is made of a solid polymeric material. In other embodiments, the body is made of solid metallic material.

According to embodiments of the present invention, at least one of the faces of the fastener is configured to engage a corresponding clip lock slot which is formed into a substrate. The height dimension of the fastener body is configured specifically to match with the dimension of a routed slot in a first substrate such that when one face is inserted into the routed slot, the other face is embedded in or otherwise attached to another substrate or element. In an embodiment, when one face of the fastener is inserted into a routed slot, the remaining portion of the fastener body is inserted at the opposing face into a corresponding routed slot routed in another substrate.

In another embodiment, while a first face of the fastener is insertable into a routed slot, the remaining portion of the fastener body is inserted at an opposing second face into a substrate by pressure, for example by way of two posts extending from the second face. In another embodiment, each of the two posts has a barbed outer surface.

The fastener locks substrates together such that the substrate edges are flush against each other, revealing no portion of the fastener. The fastener and slots are essentially hidden from view when installed, resulting in a connection having an invisible look.

Additional features and benefits of the exemplary embodiment(s) of the present invention will become apparent from the detailed description, figures and claims set forth below.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 1 illustrates a front view of the permanent clip lock, according to an embodiment of the present invention.

FIG. 2 illustrates a perspective view of the permanent clip lock, according to an embodiment of the present invention.

FIG. 3 illustrates a cross-sectional view, taken along section A-A of FIG. 1, of the permanent clip lock, according to an embodiment of the present invention.

FIG. 4 illustrates a top view of the permanent clip lock, according to an embodiment of the present invention.

FIG. 9 illustrates a front view of the permanent barbed clip lock, according to an embodiment of the present invention.

FIG. 10 illustrates a perspective view of the permanent barbed clip lock, according to an embodiment of the present invention.

FIG. 11A, 11B illustrate a cross-sectional view (taken along section A-A of FIG. 9) and a side view, respectively of the permanent barbed clip lock, according to an embodiment of the present invention.

FIG. 12 illustrates the top view of the permanent barbed clip lock, according to an embodiment of the present invention.

FIG. 30 illustrates a top view of the releasable clip lock or releasable barbed clip lock rout with a router bit hole, according to an embodiment of the present invention.

FIG. 31 illustrates a perspective view of the releasable clip lock or releasable barbed clip lock rout with a router bit hole, according to an embodiment of the present invention.

FIG. 32 illustrates a front view of the releasable clip lock or releasable barbed clip lock rout with a router bit hole, according to an embodiment of the present invention.

FIG. 33 illustrates the cross-sectional side view of FIG. 32 along Section A-A, of a releasable clip lock or releasable barbed clip lock rout with a router bit hole, according to an embodiment of the present invention.

DETAILED DESCRIPTION OF SPECIFIC EMBODIMENTS

Figure 8:
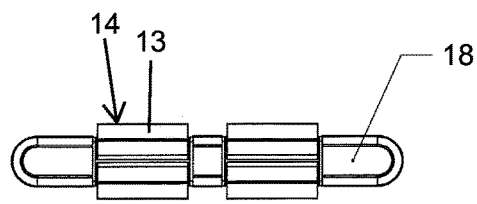
FIG. 8 illustrates a top view of the permanent or releasable clip lock, according to an embodiment of the present invention.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Embodiments of the present invention can be one solid piece of material. Embodiments of the present invention are ideally made out of a plastic or metal composite material. Aluminum or steel may be utilized for construction with a sheet metal type design. Metal embodiments are used when more shear strength is needed for a particular structure or used for higher temperature environments so the fasteners do not plasticize. The objects upon which the fastening system may be applied are hardware, panels, substrates, other construction elements and connections, which can comprise a variety of materials including wood, plastic and/or metal alloys, composites, or combinations thereof. The fastening system uses clips 14 from a fastener and a rout 37 from a substrate or panel 34 to secure multiple substrates or panels 34 together. To make a secure connection between multiple substrates or panels 34, the fastener comprising the locking clips 14 are pushed either by hand, or tapped with a hammer, or in some instances, already pre-installed into one substrate or panel 34 in which case the substrate or panel 34 with the fastening system pre-applied is inserted into the rout 37 of a mating substrate or panel 34. The clips 14 compress to allow it to be inserted into the clip slot 33 or double slot 49 of the mating substrate or panel 34. When the clips 14 of the fastener are completely inside the rout 37 of the mating substrate or panel 34, the clips 14 are now inside the undercut 25 and expand/return back to the initial position of the clip 14 creating a lock. The fastening system can be pre-installed (for example, at the manufacturer) before the substrates or panels 34 are connected together. The fasteners are pre-installed in one panel 34 or one substrate. No gaps are created at the connection point.

The term rout is given its ordinary meaning but can also refer to the permanent or releasable rout 37 of the clip lock fastener 1 or of the barbed clip lock fastener 2. The releasable rout is also referred to as the double slot 49. The permanent rout is also referred to as the clip slot 33. The center support slot 52 can also be referred to as the first slot/depth section 52. The undercut slot 23 can also be referred to as the second slot section 23. The insertion/release slot 43 can also be referred to as first/insertion groove. The keyway 45 can also be referred to a second/keyway groove. The fastener 1, 2 has a stopping face 18 or the mounting face that can also be referred to as first face 18a and the side opposing the stopping face 18 or the mounting face can also be referred to as the second face 18b. According to an embodiment of the present invention, the clips 14 are located on each side of the fastener 1, 2 on a first surface 5a and second surface 5b.

FIGS. 1-8 illustrate various embodiments of a clip lock 1 fastener (hereinafter referred to as "clip lock"). FIGS. 1-4 illustrate an embodiment of a permanent clip lock 1, comprising a barbed post 4, upper barb 6, lower barb 7, end post 8, insertion chamfer 10, clip 14, stopping face 18, triangular support bar 22, hook undercut 24, clip hook 26, cantilever arm 28, deflection space 29, center section 40, flanges 13, chasm 48. Referring to FIG. 1, which illustrates a front view of a permanent clip lock, according to an embodiment of the present invention, the permanent clip lock 1 is symmetrical about the center section 40, has four clips 14, upper barbs 6 and lower barbs 7, and meant for connecting two clip slots 33 together. The length of the permanent clip lock 1 as illustrated in FIG. 1 is about 40 millimeters, the height is about 18 millimeters, and the width is about 8 millimeters. While the embodiment illustrated in FIG. 1-4 includes specific dimensions, it will be understood that many other sizes and dimensions of the permanent clip lock 1 can be used in conjunction with the fastening system, panels 34 and substrates. The permanent clip lock 1 can be made of a nylon material; however, other abovementioned materials can also be contemplated.

Figure 17:
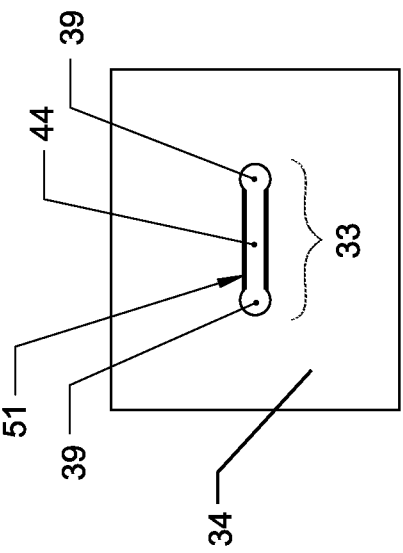
FIG. 17 illustrates a top view of the permanent clip lock or permanent barbed clip lock rout, according to an embodiment of the present invention.

The barbed posts 4 are inserted into a barb insertion hole 39 of a clip slot 33 in a rout of a substrate (not shown, see FIG. 17). The insertion chamfer 10 aligns the barbed posts 4 with the barb insertion hole 39. The upper barbs 6 and lower barbs 7 are a larger radius than the barb insertion hole 39 so the upper barbs 6 and lower barbs 7 flex upward toward the center of the end post 8 when the clip lock 1 is inserted into the clip slot 33. The barbed posts 4 have a smaller radius than the barb insertion hole 39; this allows room for the upper barbs 6 and lower barbs 7 to flex. The upper barbs 6 and lower barbs 7 dig into the walls of the barb insertion hole 39 to prevent the fastener from pulling back out of the clip slot 33. The end posts 8 have a slightly larger radius than the barb insertion hole 39 and fit snug inside the barb insertion hole 39. The interference fit stiffens and increases the sheer strength of the overall joint when two panels 34 are connected using the permanent clip lock 1. The clips 14 grip an undercut 25 of a rout in a substrate (not shown, see FIG. 20) in the clip slot 33. When tension is placed on the permanent clip lock 1 to remove the barbed post 4 from the barb insertion holes 39, the upper barbs 6 and lower barbs 7 can only slightly flex back to their initial position before digging into the panel 34 or substrate. Since the upper barbs 6 and lower barbs 7 are securely lodged into the substrate or panel 34 when the permanent clip lock 1 is under tension, the joint remains solid and sturdy.

FIG. 2 illustrates a perspective view of the permanent clip lock, according to an embodiment of the present invention comprising a chasm 48 and flange 13 of the clip 14, also referred to as a tapered edge. The chasm 48 allows the clips 14 to flex inward as it is inserted into a clip channel slot 44 of rout in a substrate (not shown, see FIG. 17). The flange 13 is the tapered surface of the hook 26 beginning from the edge of the undercut 24. The flange 13 guides the clip 14 into the clip channel slot 44. The angle of the flange 13 matches the angle of an insertion chamfer 51 in a rout of a substrate (not shown, see FIG. 17) so the two surfaces are parallel when they come into contact. When the permanent clip lock 1 is inserted down into the clip slot 33 (not shown, see FIG. 21), this downward force is transferred into bending the two flexible cantilever arms 28 into the deflection space 29. This allows the clip hooks 26 to pass a center support slot 52 in the rout (not shown, see FIGS. 29 and 33). According to an embodiment, each clip hook 26 has a substantially triangular profile along its cross-section. As noted, each clip hook 26 protrudes away from a first or second surface 5a, 5b of the center support section with a flat surface 24 (a hook undercut) parallel to a face 18 and with an inclined surface 13 (flange) tapering toward the face 18. Once fully inserted, the cantilever arm 28 springs back to its initial position and the hook undercut 24 sits flush, parallel against the undercut 25 of the clip channel slot 44. This locks the permanent clip lock 1 to the substrate or panel 34. Both the upper barbs 6 or lower barbs 7 and the clips 14 provide holding power to the substrate or panel 34 to fasten the permanent clip lock 1 to the substrate or panel 34. Panels 34 with identical permanent routs 37 can be instantly fastened and locked together by the permanent clip lock 1 without the use of glue. Once each half of the permanent clip lock 1 is fully inserted into each panel 34, the panels are permanently locked and clamped together.

FIG. 3 illustrates a cross-sectional view of the permanent clip lock, according to an embodiment of the present invention. The clip lock 1 is inserted into the clip channel slot 44 (not shown, see FIG. 17) to fasten the clip lock 1 to the substrate with the stopping face 18 parallel and down toward the bottom of the clip channel lock slot 44. As the flanges 13, which are the tapered edges of the clip hook 26, enter the clip channel lock slot 44, the interference between the hook undercut 24 and the clip channel slot 44 causes the cantilever arm 28 to deflect into the deflection space 29. The deflection space 29 allows the clip hook 26 to fully enter the clip channel lock slot 44. The hook undercut 24 prevents the clip lock 1 from pulling vertically out of the clip channel lock slot 44 and grips the undercut 25 of the clip slot 33. The center section 40 keeps the base of the cantilever arm 28 rigid and keeps the permanent clip lock 1 in a rigid position. The triangular support bar 22 provides extra rigidity to the structure of the clip lock 1 for ease of installation and to stiffen the overall joint. The triangular support bar 22 also decreases torsion in the permanent clip lock 1 body. A mating panel 34, substrate or second object with the clip channel slot 44 is aligned over the installed permanent clip lock 1 and is pushed down over the clip lock 1 until it snaps into position. Using the clip channel slot 44, the permanent clip lock 1 can be installed by snapping it into the clip channel slot 44, utilizing the function of the cantilever arm 28 and clip hook 26 and the lower barb 7. The permanent clip lock 1 can be permanently installed in the clip channel slot 44.

FIG. 4 illustrates a top view of the permanent clip lock, according to an embodiment of the present invention. The stopping face 18 keeps the permanent clip lock 1 parallel in the clip channel slot 44 (not shown, see FIG. 17), allowing it to sit substantially flush against the bottom of the clip slot 33 and prevents the permanent clip lock 1 from being inserted more than about half its height into the clip slot 33. When the stopping face 18 reaches the bottom of the clip slot 33, the permanent clip lock 1 is fully inserted and locked to the panel 34 and is protruding about half way out of the panel 34. A mating panel 34 containing an identical clip slot 33 can then be attached to the exposed portion of the permanent clip lock 1.

Figure 5:
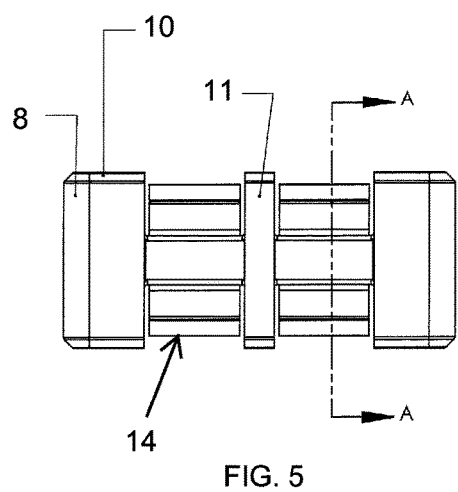
FIG. 5 illustrates a front view of the permanent or releasable clip lock, according to an embodiment of the present invention.

FIG. 5 illustrates a front view of the permanent or releasable clip lock, according to an embodiment of the present invention, having similar structure as the abovementioned clip lock 1 embodiment shown in FIGS. 1-4; however, in this embodiment, the clip lock 1 has a center post 11 which provides more rigidity to the clip lock 1. The center post 11 splits the clips 14 up into four sections, so it has eight clips 14 as opposed to four. Splitting up the clips 14 decreases the pressure needed to insert the clip lock 1 into a rout 37, making installation easier for the user. However, this decreases the surface area of the hook undercut 24 which decreases the holding power of the clips 14. The end post 8 is elongated and is the same width as the center support slot 52 (not shown, see FIGS. 29 and 33) of both the clip slot 33 and a double slot 49 in a rout of a substrate (not shown, see FIGS. 17 and 26). The end post 8 allows the clip lock 1 to slide out of the keyway 45 and up though the insertion/release slot 43 in a rout of a substrate (not shown, see FIG. 26) or through the double slot 49. It can be used with the clip slot 33 but does not have as much holding power without the upper barbs 6 and lower barbs 7. The lack of barbs 3, allow panels 34 to be disconnected and the fastener to be removed without damaging the substrate. This particular embodiment can be used with the clip slot 33 or releasable rout, also called the double slot 49, further described below. When used with the double slot 49, the user can push the clip lock 1 directly into the keyway 45 or slide the clip lock 1 from the insertion/release slot 43 into the keyway 45.

Figure 6:
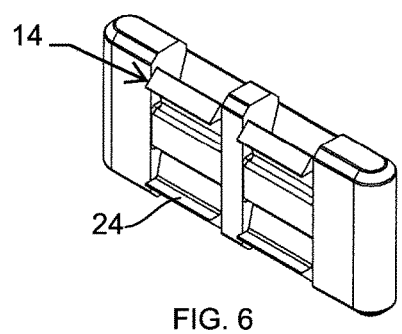
FIG. 6 illustrates a perspective view of the permanent or releasable clip lock, according to an embodiment of the present invention.
Figure 7A:
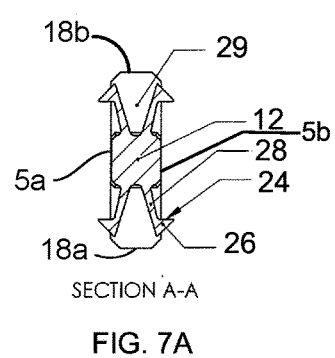
FIGS. 7A, 7B illustrate a cross-sectional view (taken along section A-A of FIG. 5) and a side view respectively, of the permanent or releasable clip lock, according to an embodiment of the present invention.
Figure 7B:
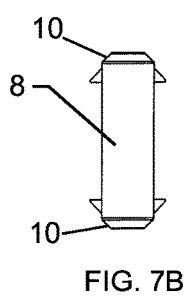

FIG. 6 illustrates a perspective view of the permanent or releasable clip lock, according to an embodiment of the present invention showing the top of the clip lock 1 and clip 14. FIG. 7A illustrates a cross-sectional view of the permanent or releasable clip lock, taken along section A-A of FIG. 5, according to an embodiment of the present invention. The center support 12 keeps the base of the cantilever arms 28 rigid and keeps the clip lock 1 in a rigid position. The deflection space 29 allows the clip hook 26 to fully enter the clip channel slot 44 (not shown, see FIG. 17). As shown in the embodiment, each deflection space 29 flares out from the center toward a respective face 18a, 18b. The hook undercut 24 prevents the clip lock 1 from pulling vertically out of the clip channel slot 44. FIG. 7B illustrates a side view of the permanent or releasable clip lock, according to an embodiment of the present invention showing a substantially elongated form of the end post 8 and the insertion chamfers 10 (slanted top and bottom portion) of the end post 8. FIG. 8 illustrates a top view of the permanent or releasable clip lock, according to an embodiment of the present invention. The stopping face 18 when inserted into the clip channel slot 44 or the insertion/release slot 43 of a substrate (not shown, see FIG. 26), is substantially parallel with the bottom of the clip channel slot 44 or the insertion/release slot 43 so as to provide support for the clip lock 1. When the stopping face 18 reaches the bottom of the clip slot 33 or the double slot 49, the clip lock 1 is fully inserted and locked to the panel 34 and is protruding about half way out of the panel 34. A mating panel 34 containing an identical clip slot 33 or double slot 49 can then be attached.

FIGS. 9-16 illustrate different embodiments of a barbed clip lock 2 fastener (hereinafter referred to as "barbed clip lock"), comprising barbed post 4, upper barb 6, lower barb 7, end post 8, starting post 9, insertion chamfer 10, clip 14, insertion chamfer 16 located on the ends of the barbed post 4, stopping face 18, triangular support bar 22, hook undercut 24, clip hook 26, cantilever arm 28, deflection space 29, lower barb post 100, and center section 40.

FIG. 9 illustrates a front view of the permanent barbed clip lock 2, according to an embodiment of the present invention. This embodiment of the barbed clip lock 2 works only with the clip slot 33 as shown in FIG. 17. The barbed clip lock 2 is made from nylon material; however, abovementioned materials can also be contemplated. The insertion chamfers 10 align the lower barbed post 100 with the barb insertion holes 39 (not shown, see FIG. 17). The insertion chamfer 16 guides the starting post 9 into the barbed post holes 47 (not shown, see FIG. 24). The starting post 9 are slightly smaller than 8 millimeters in diameter and are inserted by hand into two 8 millimeter diameter barbed post holes 47 drilled about 32 millimeters apart in the edge of a panel 34. The starting post 9 holds the fastener in the barbed post holes 47 making it easier to install the barbed clip lock 2 with a hammer. The end post 8 is solid and is inserted into 8 millimeter barbed post holes 47. The end post 8 is configured to be about 0.1 millimeters larger in diameter than the barbed post holes 47, thus acting as a dowel in the substrate creating a very stiff and sturdy joint. The barbed posts 4 are about 32 millimeters apart from each other, which allow manual boring machines with standard 32 millimeters drill spacing to be used to drill the holes 47. The barbed post 4 are pushed into barbed post holes 47 and do not require threading or screws to secure in place. The barbs comprising the upper barbs 6 and lower barbs 7, are semi-circular in configuration to provide easy installation and a high hold strength without the use of glue. This allows the upper barbs 6 and lower barbs 7 to flex inward when the fastener is pushed into the clip channel slot 44 or barbed post holes 47. The barbed post 4 is slightly smaller than the barbed post hole 47 which gives room for the barbs 3 to flex into. When made of material such as nylon, the thin triangular cross-sectional geometry of the upper barbs 6 or lower barbs 7 in relation to the size of the barbed post hole 47 and barbed clip lock 2, allows the barbs 3, which include the upper barb 6 and lower barb 7, to flex easily when the barbed posts 4 are inserted into the barbed post holes 47, and when the lower barbed posts 100 are inserted into the barb insertion holes 39 in the clip slot 33. This decreases the insertion force needed to install the barbed clip lock 2 into the holes and reduces the risk of weakening the panel 34 or substrate. Forcing oversized, rigid barbs into holes drilled into the edge of a wood particle board panel (for example) can expand the holes and create stress cracks that can damage and weaken the substrate. Flexible barbs can therefore have larger radii than rigid barbs in relation to the hole size. The larger radii create more interference between the barbs and the holes which increase the holding strength of the barbed clip lock 2 to the panel 75 or substrate. The lower barbs 7 are a larger radius than the barb insertion hole 39 so they flex upward toward the center of the end post as the barbed clip lock 2 is inserted into the clip channel slot 44. The lower barbs 7 dig into the walls of the barb insertion hole 39 to prevent the fastener from pulling back out of the rout 37, creating a much stronger joint. The end post 8 aids in substantially aligning opposing panels 34 by meeting the clip channel slot 44 with the barb insertion hole 39 of the panels 34. The upper barb 6 cut into the barbed post holes 47 in order to secure the fastener to the panel 34. The clip 14 clips into the clip channel slot 44.

FIG. 10 illustrates a perspective view of the permanent barbed clip lock, according to an embodiment of the present invention illustrating the cylindrical configuration of the barbed post 4 and the semi-circular shape of the upper barb 6 and lower barb 7 and the slanted edge of the clip 14 called the flanges 13. FIG. 10 also illustrates the substantially even surface of the hook undercut 24 located on the top edge of the clip 14.

FIG. 11A, 11B illustrate a cross-sectional view and side view respectively, of the permanent barbed clip lock, according to an embodiment of the present invention. FIG. 11A illustrates a cross-sectional view at A-A of FIG. 9, having a clip hook 26 that pushes against the insertion chamfer 51 on the clip slot 33 (not shown, see FIG. 17) causing the cantilever arm 28 to flex inward into the deflection space 29. Once fully inserted into the clip channel slot 44, the cantilever 28 arm springs back into its original position. The hook undercut 24 aligns with the undercut 25 on the clip channel slot 44 creating a non-removable snap joint. The barbed clip lock 2 is inserted into the clip channel slot 44 of the rout 37 (not shown). FIG. 11B illustrates a side view of the permanent barbed clip lock 2 shown in FIG. 11A.

FIG. 12 illustrates a top view of the permanent barbed clip lock, according to an embodiment of the present invention. The permanent barbed clip lock 2 comprises a stopping face 18 (or 18b), which when the barbed posts 4 are inserted into the barbed post holes 47, the stopping face 18b is substantially flushed against the surface of the panel 34 or substrate once fully inserted (not shown, see FIG. 24). A mating panel 34 containing an identical clip slot 33 can then be attached to the portion of the barbed clip lock 2 that is protruding (first face 18b side) from the first panel 34 or substrate (not shown, see FIG. 24).

Figure 13:
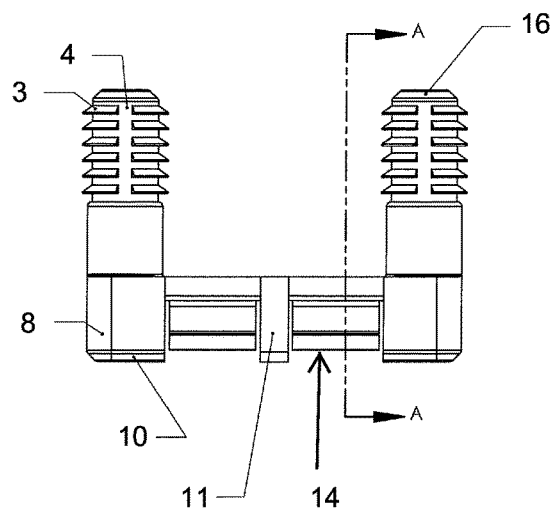
FIG. 13 illustrates a front view of a permanent or releasable barbed clip lock, according to an embodiment of the present invention.
Figure 26:
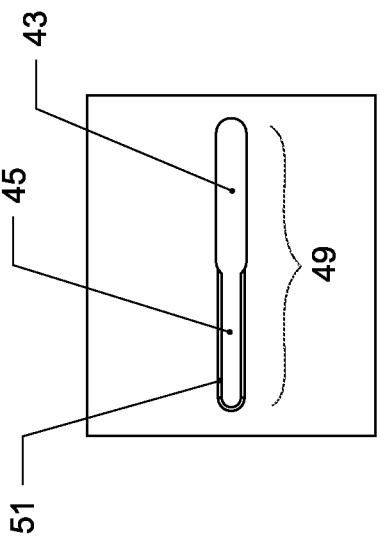
FIG. 26 illustrates a top view of the releasable clip lock or releasable barbed clip lock rout, according to an embodiment of the present invention.

FIG. 13 illustrates a front view of the permanent or releasable barbed clip lock, according to an embodiment of the present invention. This embodiment of the barbed clip lock 2 works with both the permanent and releasable rout. The permanent rout, also called the clip slot 33 as shown in FIG. 17 and the releasable rout, called the double slot 49 as shown in FIGS. 26 and 30, are further described below. This embodiment of FIG. 13 has similar structures as the above-mentioned barbed clip lock 2 embodiment shown in FIGS. 9-12; however, in this embodiment, the barbed clip lock 2 has a center post 11 which provides more rigidity to the clip lock 1. The center post 11 splits the clips 14 up into two sections, so it has four clips 14 as opposed to two. Splitting up the clips 14 decreases the pressure needed to insert the barbed clip lock 2 into a rout, making installation easier for the user. However, this decreases the surface area of the hook undercut 24 which decreases the holding power of the clips 14. It also does not have the lower barb 7. Not having the lower barb 7 allows the barbed clip lock 2 to slide to the insertion/release slot 43 of the double slot 49. This particular embodiment can be used with the clip slot 33 or double slot 49, further described below. The lower portion of the end post 8 is elongated and is the same width as the center support slot 52 of both the clip slot 33 (not shown, see FIG. 20) and double slot 49 (not shown, see FIG. 29 and FIG. 33). Though it does not provide as much stability as the end post 8 of the embodiment shown in FIG. 9, this embodiment allows the barbed clip lock 2 to slide out of the keyway 45 and up through the insertion/release slot 43 or the double slot 49. Alternatively, the user can push the barbed clip lock 2 directly into the keyway 45 rather than sliding the barbed clip lock 2 from the insertion/release slot 43 into the keyway 45. It can be used with the clip slot 33 but does not have as much holding power without the lower barbs 7. The lack of lower barbs 7, however allow panels 34 to be disconnected and the fastener to be removed without damaging the substrate. The difference is that the clips 14 are divided by the center post 11 into two separate sections so it has four clips 14 as opposed to two. The barbs 3 and barbed posts 8 function the same way as the lower barbs 7 and lower barb post 100 of FIG. 9.

Figure 14:
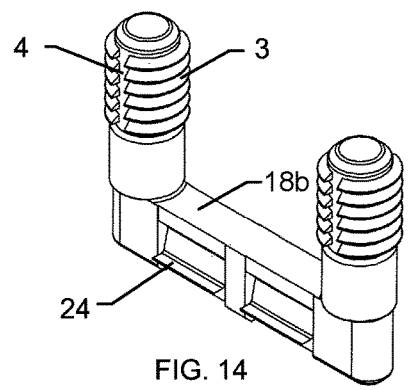
FIG. 14 illustrates a perspective view of a permanent or releasable barbed clip lock, according to an embodiment of the present invention.
Figure 15A:
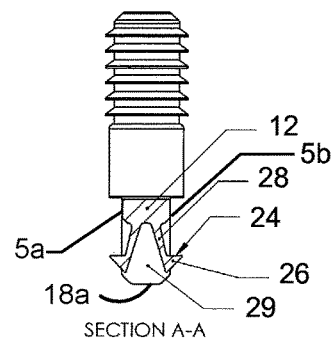
FIGS. 15A, 15B illustrate a cross-sectional view (taken along section A-A of FIG. 13) and a side view, respectively of a permanent or releasable barbed clip lock, according to an embodiment of the present invention.
Figure 15B:
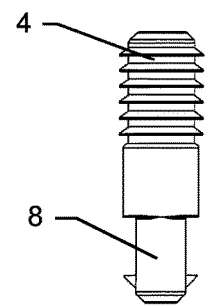

FIG. 14 illustrates a perspective view of the permanent or releasable barbed clip lock, according to an embodiment of the present invention, illustrating the cylindrical configuration of the barbed post 4 and the semi-circular shape of the barb 3. FIG. 14 also illustrates the substantially even surface of the hook undercut 24. FIGS. 15A, 15B illustrate a cross-sectional view and side view respectively, of the permanent or releasable barbed clip lock, according to an embodiment of the present invention. The embodiment shown in FIG. 15A is similar to the embodiment of FIG. 11A as described above; however, the embodiment of FIG. 15A has the center support 12 which keeps the barbed clip lock 2 in a rigid position. FIG. 15B illustrates that the end post 8 is more narrow than the barbed post 4 comprising the barbs 3 and that the end post 8 is about the same length as the barbed post 4.

Figure 16:
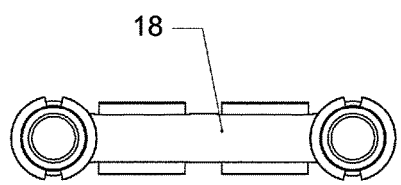
FIG. 16 illustrates a top view of a permanent or releasable barbed clip lock, according to an embodiment of the present invention.

FIG. 16 illustrates a top view of the permanent or releasable barbed clip lock, according to an embodiment of the present invention comprising a stopping face 18, which when the barbed post 4 are inserted into the barbed post holes 47, the stopping face 18 (face 18b) is substantially flushed against the surface of the panel 34 or substrate once fully inserted. A mating panel 34 containing a clip slot 33 or double slot 49 can then be attached to the portion of the barbed clip lock 2 that is protruding (first face 18b) from the first panel 34 or substrate.

FIG. 17 illustrates a top view of the permanent clip lock or permanent barbed clip lock rout, also called a clip slot 33, comprising barb insertion holes 39, clip channel slot 44, and insertion chamfer 51 according to an embodiment of the present invention. The clip slot 33 is used with the embodiments of the clip lock 1 shown in FIGS. 1-4 and the barbed clip lock 2 shown in FIGS. 9-12. For the clip lock 1, routing is required on surfaces of two separate panels 34 to connect them together and to create a solid joint between the mating surfaces with the clip lock 1. For the barbed clip lock 2 routing is only required on the surface of a panel 34 or substrate and drilling is required on the surface of another panel 34 to connect them together and create a solid joint between the mating surfaces with the barbed clip lock 2. The distance from center to center of the barb insertion holes 39 is about 32 millimeters. The diameter of each barb insertion hole 39 is about 8 millimeters. The depth range of the clip slot 33 is about 10.5 to about 10.75 millimeters. Other dimensions are possible. The clip slot 33 can be made in any location on the panel 34, such as the edges, faces of panels 34 or substrates so that the fasteners can connect edges to edges, faces to faces or edges to faces. As such, a special configuration of the fastener is not required.

The barb insertion holes 39 receives the lower barb 7 of the clip lock 1 or the lower barb 7 of the barbed clip lock 2 when it is inserted into the clip channel slot 44. The insertion chamfer 51 is an angled cut that matches the angle of the clip hook 26 of the clip lock 1 or the barbed clip lock 2. As the clip lock 1 or barbed clip lock 2 is inserted into the clip channel slot 44, the clip hooks 26 push against the insertion chamfers 51 causing the flexible cantilever arms 28 to flex inward into the deflection space 29. Once fully inserted into the clip slot 33, the flexible cantilever arm 28 springs back into its original position. The hook undercut 24 matches up with the undercut 25 on the clip slot 33 creating a non-removable snap joint. The undercut 25 is located in the clip channel slot 44 (not shown, see FIG. 20).

Figure 18:
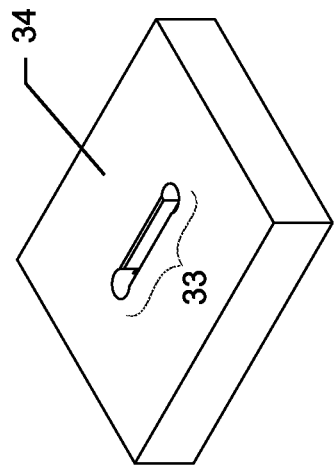
FIG. 18 illustrates a perspective view of the permanent clip lock or permanent barbed clip lock rout, according to an embodiment of the present invention.
Figure 19:
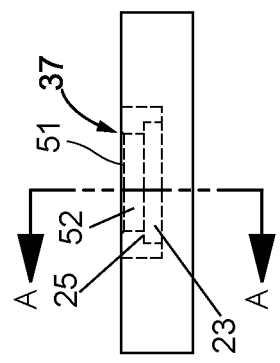
FIG. 19 illustrates a front view of the permanent clip lock or permanent barbed clip lock rout, according to an embodiment of the present invention.

FIG. 18 illustrates a perspective view of the permanent clip lock or permanent barbed clip lock rout, also called a clip slot 33, according to an embodiment of the present invention located on the face of a panel 34. FIG. 19 illustrates a front view of the permanent clip lock or permanent barbed clip lock clip slot 33, according to an embodiment of the present invention showing phantom lines of the rout 37 and how it is routed in the panel 34 or substrate.

Figure 20:
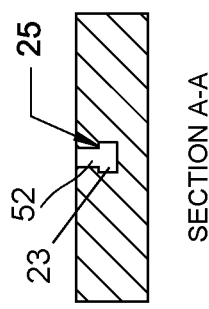
FIG. 20 illustrates a cross-sectional view of FIG. 19 along Section A-A, of a permanent clip lock or permanent barbed clip lock rout, according to an embodiment of the present invention.
Figure 21:
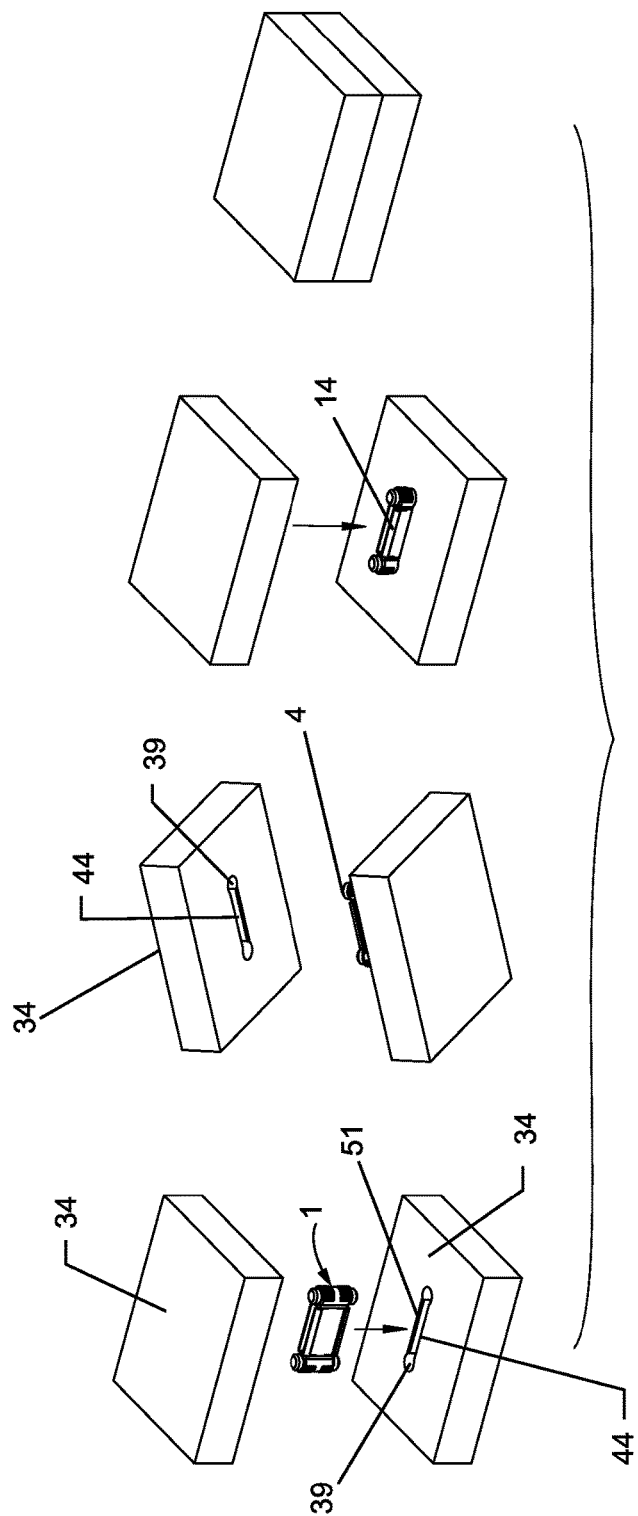
FIG. 21 illustrates a progression of panel assembly with the permanent clip lock, according to an embodiment of the present invention.

FIG. 20 illustrates the cross-sectional side view of FIG. 19 along Section A-A, of a permanent clip lock or permanent barbed clip lock rout, according to an embodiment of the present invention. The cross section illustrates a profile of the clip channel slot 44 having a undercut 25 that aligns with the hook undercut 24 of the fastener, creating a non-removable snap joint. The rout 37 is straight and t-slotted and all routs or slots are cut with a router using router bit 62 (not shown, see FIG. 38) FIG. 21 illustrates a panel assembly with the permanent clip lock 1, according to an embodiment of the present invention comprising the steps of inserting the clip lock 1 into the clip slot 33, comprising the clip channel slot 44 of the first panel 34, insertion chamfer 51, and barb insertion holes 39. Once the clip 14 grips the undercut 25 in the clip slot 33, the exposed top portion of the clip lock 1 is ready to be inserted into a mating panel 34 having a clip slot 33. The mating panel 34 is aligned with the exposed end of the clip lock 1 so that the barbed posts 4 are aligned with the barb insertion hole 39 and the clips 14 are aligned with the clip channel slot 44. Lastly, the two panels 34 snap together to create a permanent joint. This fastening system allows for connections and fasteners to be hidden, therefore appearing invisible and aesthetically pleasing and clean. Once the panels 34 are fastened together with the clip lock 1, the two mating surfaces are permanently and solidly clamped together without the use of tools or glue.

Figure 22:
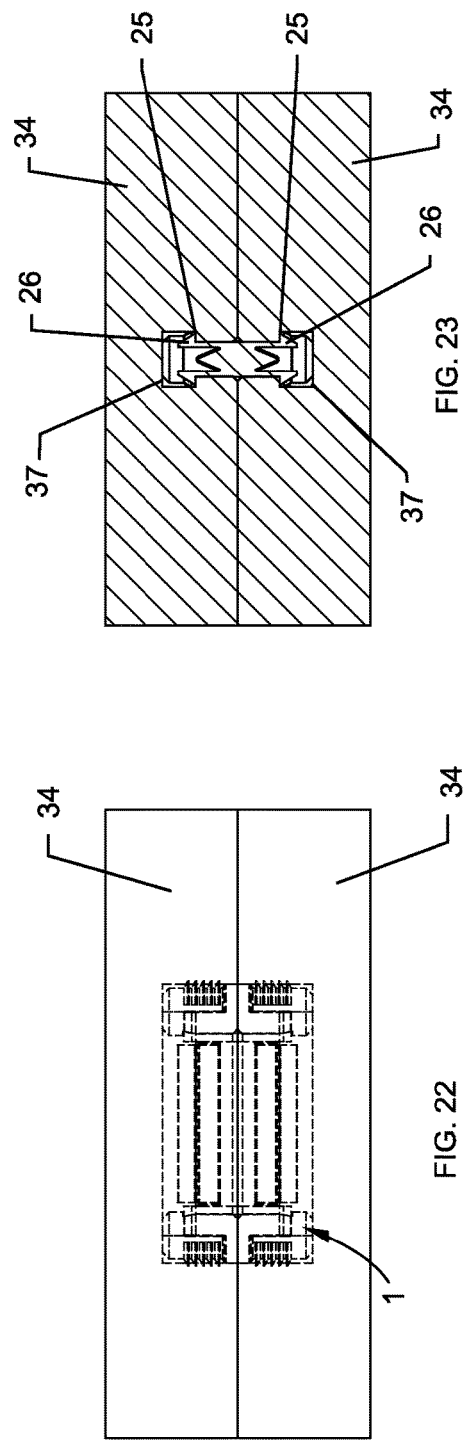
FIG. 22 illustrates a front view of assembled panels with the permanent clip lock, according to an embodiment of the present invention.

FIG. 22 illustrates a front view of assembled panels 34 with the permanent clip lock 1, according to an embodiment of the present invention, showing about half of the clip lock 1 located in the clip channel slot 44, shown in phantom lines of one panel 34 and half of the clip lock 1 located in the clip channel slot 44 of the mating panel 34. As a result of this fastening system, the joints are invisible and sturdy because the connection points are hidden within the panel 34 or substrate.

Figure 23:
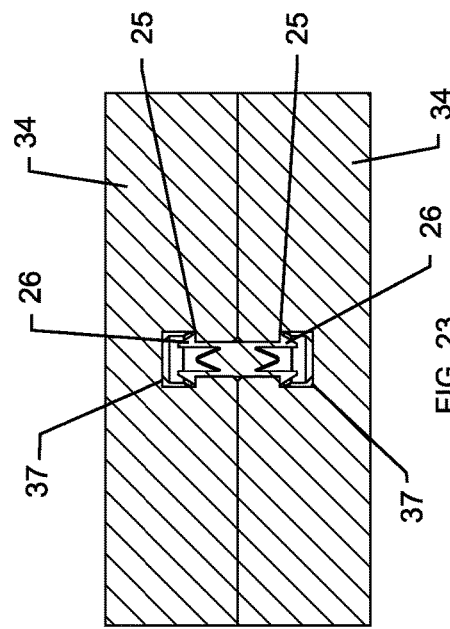
FIG. 23 illustrates a cross-sectional view of FIG. 22 of assembled panels with the permanent clip lock, according to an embodiment of the present invention.

FIG. 23 illustrates a cross-sectional view of FIG. 22, of assembled panels 34 with the permanent clip lock 1, illustrating how the clip lock 1 connects the two panels 34 together creating a flush surface by locking the two permanent routs 37 together. The clip hooks 26 grip the undercut 25 in the clip slot 33. The clip slot 33 can also be made on various different substrates such as hinges, drawer slides, decorative sconces, castors, closet rod supports, or decorative wood trim and the like.

Figure 24:
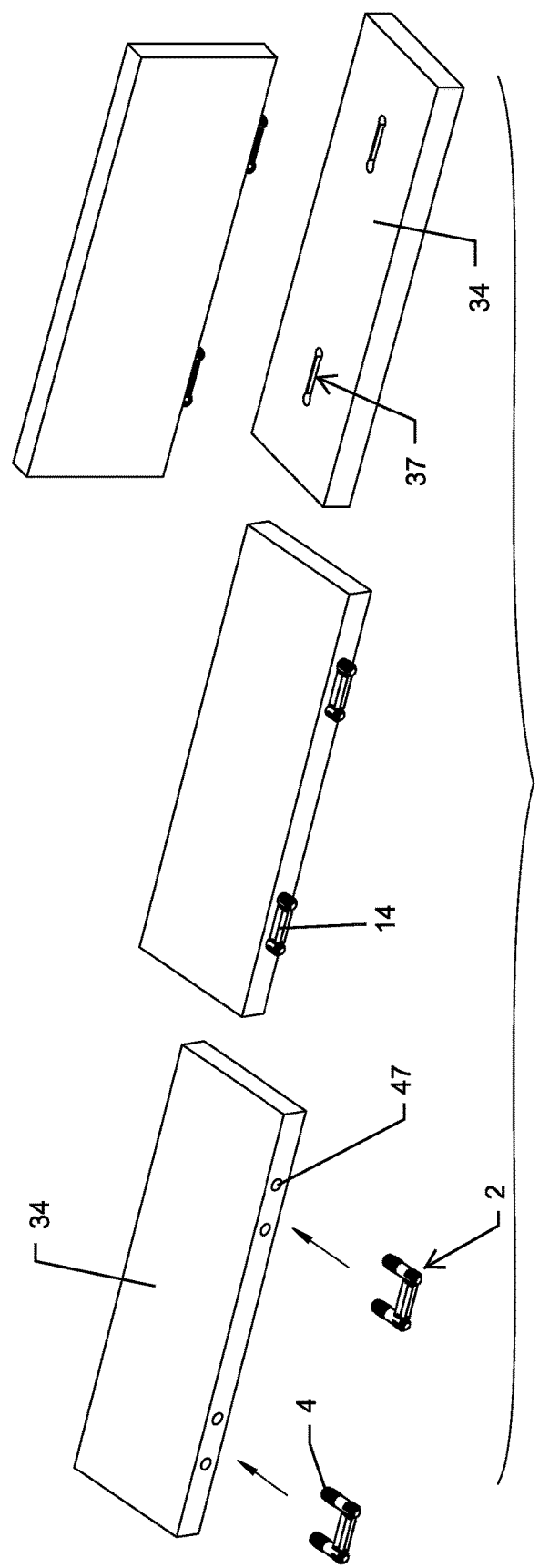
FIG. 24 illustrates a perspective view progression of panel assembly with the permanent barbed clip locks, according to an embodiment of the present invention.

FIG. 24 illustrates a panel assembly with the permanent barbed clip locks 2, according to an embodiment of the present invention. The barbed clip lock 2 has two barbed posts 4 that are inserted into two 8 millimeter barbed post holes 47 drilled about 32 millimeters apart on the edge of the panel 34. The barbed post holes 47 are drilled/bored on equipment such as a boring machine. Once the barbed clip lock 2 is secure in the panel 34, it is pushed into the clip channel slot 44 of a mating panel 34. The side comprising the barbed post 4 of the barbed clip lock 2 would typically be inserted into the thin edge of a panel 34 having pre-drilled barbed post holes 47 and the side comprising the clips 14 is connected to the face of another panel 34 having permanent routs 37 as shown.

Figure 25:
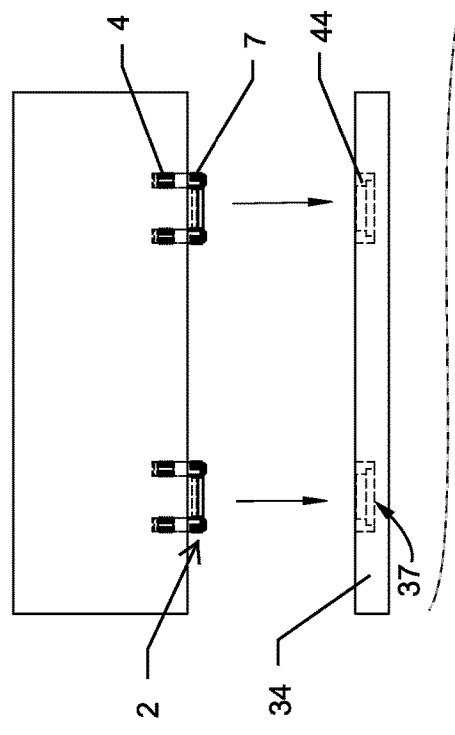
FIG. 25 illustrates a front view progression of assembling panels and of assembled panels with the permanent barbed clip locks, according to an embodiment of the present invention.

FIG. 25 illustrates a front view of assembling and assembled panels with the permanent barbed clip locks, showing one panel in the insertion position with the upper barbed post 4 in the barbed post holes 47 in phantom lines, according to an embodiment of the present invention. Once the barbed clip locks 2 are secure, the lower portion of the barbed clip lock 2 having lower barb 7 are inserted into a clip channel slot 44 of a mating panel 34 and locked into place. As described, the fastening system allows for flexibility as edges of panels or substrates or faces of panels or substrates can be connected together. According to an embodiment of the present invention, the permanent rout 37 can be easily machine routed on any surface using router bit 62, and the barbed post holes 47 (not shown, see FIG. 24) can be drilled using standard drilling equipment with an 8 millimeter diameter drill bit. The clip lock 1 and barbed clip lock 2 can align panels 34 together as designed if the barbed post holes 47 and routs 37 or 49 (not shown, see FIGS. 26 and 30) are machined in the specified locations.

FIG. 26 illustrates a top view of the releasable clip lock or releasable barbed clip lock rout, also called a double slot 49, according to an embodiment of the present invention comprising an insertion chamfer 51, keyway 45, insertion/release slot 43. The double slot 49 can be used with the clip locks shown in FIGS. 5-8 and FIGS. 13-16. The stopping face 18 of the clip lock 1 or the bottom portion of the barbed clip lock 2 is inserted into insertion/release hole 43 first and parallel to the panel 34. The keyway 45 is the section of the double slot 49 that the clip lock 1 or barbed clip lock 2 snaps into to secure the clip lock 1 or barbed clip lock 2. The clip lock 1 or barbed clip lock 2 can either snap into the keyway 45 in the same manner as the permanent rout 37, or it can be inserted in the insertion/release slot 43 and slid horizontally. The insertion/release slot 43 provides a clear opening for the clip lock 1 or barbed clip lock 2 to be inserted into without any interference with the double slot 49 and the clip hooks 26. Once the clip lock 1 or barbed clip lock 2 reach the bottom of the double slot 49, it can be slid into the keyway 45 and the hook undercut 24 slides under the undercut 25 which locks the clip lock in place (not shown, see FIG. 29). The clip lock 1 and barbed clip lock 2 cannot pull up out of the double slot 49, but it can still be released by sliding back toward the insertion/release slot 43 where is can be easily removed from the panel 34 or substrates. This allows panels fastened with the releasable clip locks 1 or barbed clip lock 2 and routs double slot 49 to be easily detached with a sliding motion as described in FIGS. 34-37. The insertion chamfer 51 helps guide the clip lock 1 or barbed clip lock 2 into the keyway 45 to flex the cantilever arms 28 inward.

Figure 27:
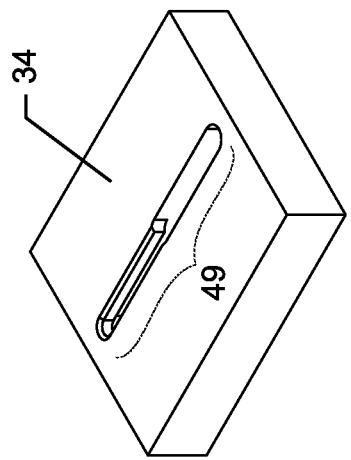
FIG. 27 illustrates a perspective view of the releasable clip lock or releasable barbed clip lock rout, according to an embodiment of the present invention.
Figure 29:
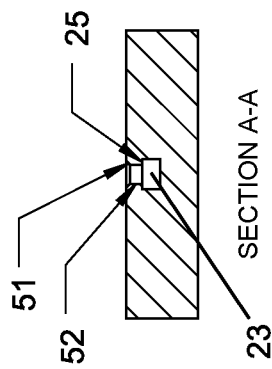
FIG. 29 illustrates the cross-sectional side view of FIG. 28 along Section A-A, of a releasable clip lock or releasable barbed clip lock rout, according to an embodiment of the present invention.
Figure 28:
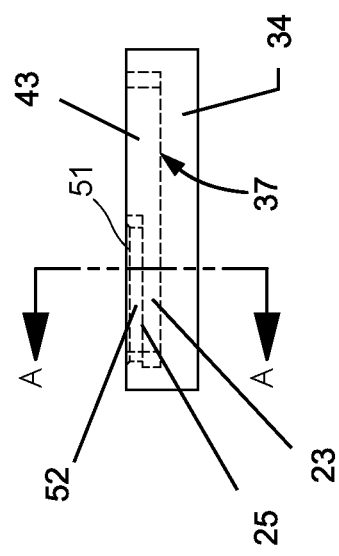
FIG. 28 illustrates a front view of the releasable clip lock or releasable barbed clip lock rout, according to an embodiment of the present invention.

FIG. 27 illustrates a perspective view of the releasable clip lock 1 or releasable barbed clip lock 2 double slot 49 located on the face of a three dimensional panel 34, according to an embodiment of the present invention. FIG. 28 illustrates a front view of the double slot 49, according to an embodiment of the present invention showing phantom lines of the rout 37 to illustrate the shape of the rout 37 when routed in the panel 34 or substrate. The insertion/release slot 43 is where the user inserts the clip lock 1 or barbed clip lock 2. Once the stopping face 18 of the clip lock 1 or the bottom side of the barbed clip lock 2 is substantially flush against the panel 34, the clip lock 1 or barbed clip lock 2 is then slid horizontally along the undercut slot 23 until the hook undercut 24 is substantially flush against the undercut 25. The clip lock 1 can also snap directly down into the keyway 45. The center support 12 fits snug in the center support slot 52. FIG. 29 illustrates the cross-sectional view of FIG. 28 along Section A-A, of a releasable clip lock 1 or releasable barbed clip lock 2 double slot 49, having an undercut 25, undercut slot 23, insertion chamfer 51 and center support slot 52. The insertion chamfer 51 is located at the top section of the rout 37 and the undercut 25 is located at the bottom section of the rout 37. The center support slot 52 is located between the insertion chamfer 51 and the undercut 25. The rout 37 is straight and t-slotted and the routing is done with a CNC router.

FIG. 30 illustrates a top view of the releasable clip lock 1 or releasable barbed clip lock 2 rout 37, also called a double slot 49, with a router bit hole 35, according to an embodiment of the present invention. The double slot 49 is routed with a router bit hole 35, insertion chamfer 51, keyway 45, insertion/release slot 43. This embodiment of the releasable clip lock 1 or releasable barbed clip lock 2 rout 37 works with the embodiments of the clip lock 1 and barbed clip lock 2 shown in FIGS. 5-8 and FIGS. 13-16. This embodiment is the same as the double slot 49 shown in FIG. 26; however, this embodiment has an additional feature called the router bit hole 35, which the router bit 62 cuts during the routing process. The clip lock 1 or barbed clip lock 2 can either snap into the keyway 45 in the same manner as the permanent rout 37, or it can be inserted in the insertion/release slot 43 and slid horizontally. The insertion/release slot 43 provides a clear opening for the clip lock 1 or barbed clip lock 2 to be inserted into without any interference with the double slot 49 and the clip hooks 26. Once the clip lock 1 or barbed clip lock 2 reaches the bottom of the rout 37, it can be slid into the keyway 45 making the hook undercut 24 slide under the undercut 25 locking the fastener in place (not shown, see FIG. 33). The clip lock 1 or barbed clip lock 2 cannot pull up out of the double slot 49, but it can still be released by sliding back toward the insertion/release hole 43 where is can be easily removed from the panel 34 or substrates. This allows panels 34 fastened with the releasable clip locks 1 or barbed clip locks 2 and double slot 49 to be easily detached with a sliding motion as described in FIGS. 34-37. The clip lock 1, and barbed clip lock 2 can also snap directly into the keyway 45.

FIG. 31 illustrates a perspective view of the double slot 49 with a router bit hole 35, located on the face of a three dimensional panel 34 according to an embodiment of the present invention. FIG. 32 illustrates a front view of the double slot 49 with a router bit hole 35, according to an embodiment of the present invention showing phantom lines of the rout 37 to illustrate the shape of the rout 37 when routed in the panel 34 or substrate. The insertion/release slot 43 is where the user inserts the clip lock 1 or barbed clip lock 2. Once the stopping face 18 of the clip lock 1 or the bottom side of the barbed clip lock 2 is substantially flush against the panel 34, the clip lock 1 or barbed clip lock 2 is then slid horizontally along the undercut slot 23 until the hook undercut 24 is substantially flush against the undercut 25. The center support 12 fits snug in the center support slot 52. FIG. 33 illustrates the cross-sectional view of FIG. 32 along Section A-A, of the double slot 49 with a router bit hole 35, having an undercut 25, undercut slot 23, insertion chamfer 51 and center support slot 52 according to an embodiment of the present invention. The insertion chamfer 51 is located at the top section of the rout 37 and the undercut 25 is located at the bottom section of the rout 37. The center support slot 52 is located between the insertion chamfer 51 and the undercut 25. The rout 37 is straight and t-slotted and the routing is done with a router.

Figure 34:
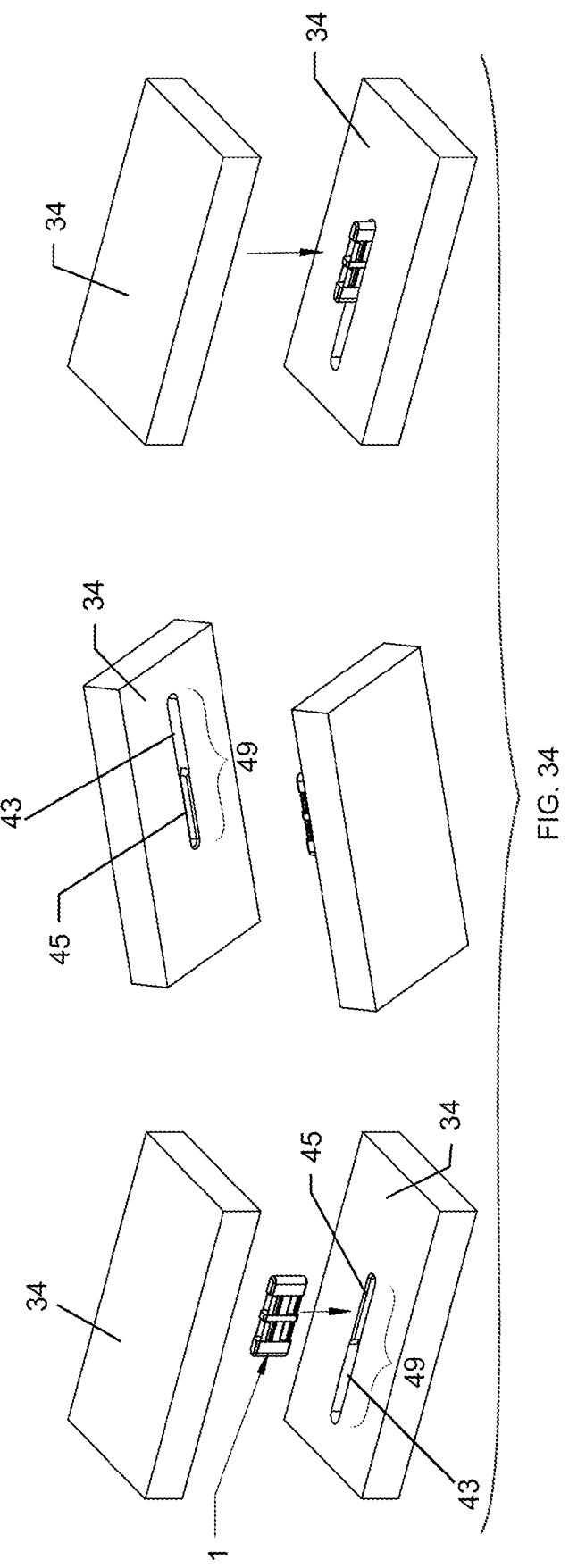
FIG. 34 illustrates a perspective view progression of panel assembly with the releasable clip lock, according to an embodiment of the present invention.
Figure 35:
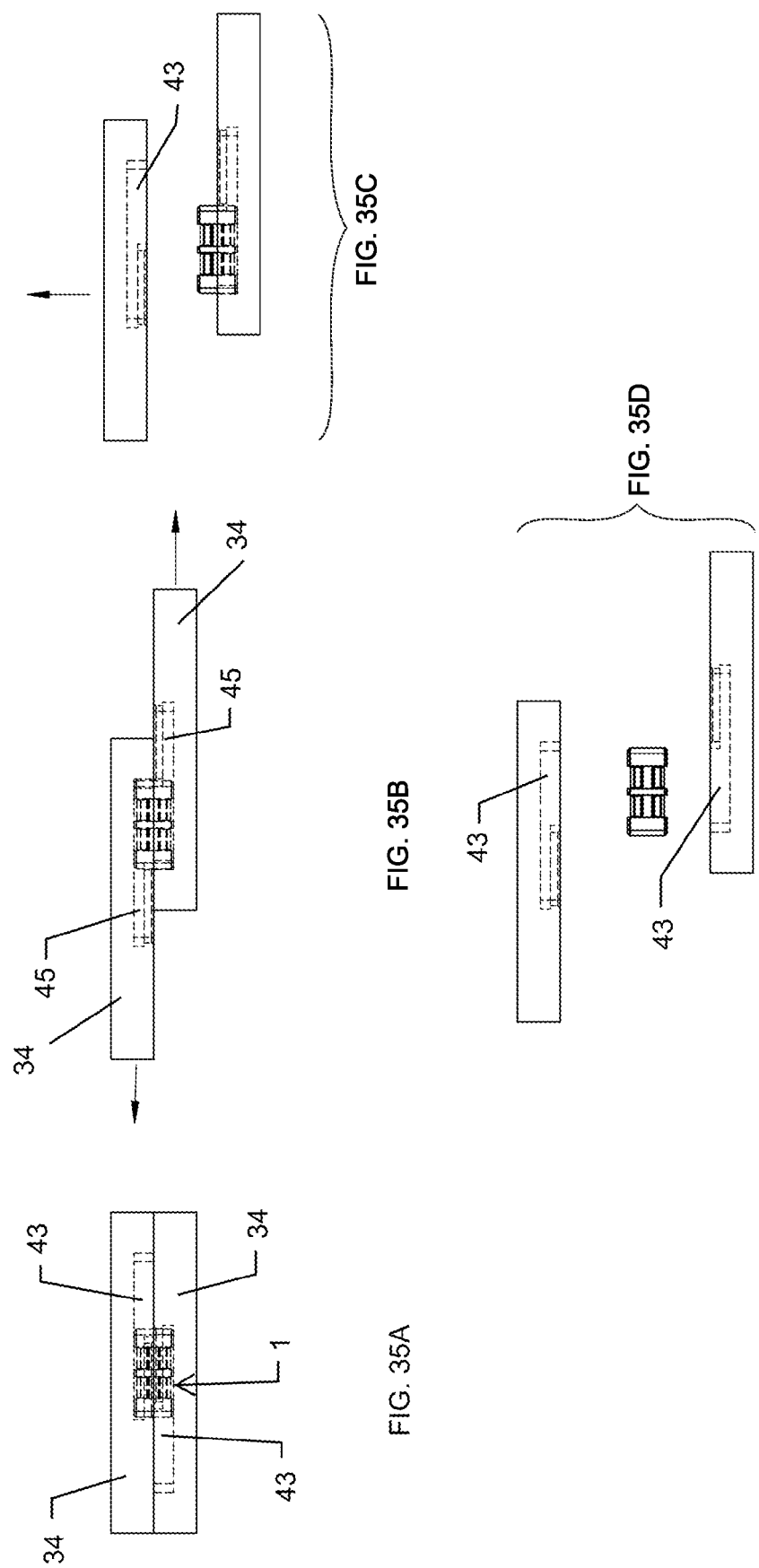
FIG. 35A illustrate a front view of two panels assembled and secured with the releasable clip lock, according to an embodiment of the present invention.
FIGS. 35B-35D illustrate a front view progression of panel disassembly with the releasable clip lock, according to an embodiment of the present invention.

FIG. 34 illustrates a panel assembly with the releasable clip lock 1, according to an embodiment of the present invention having a double slot 49 and clip lock 1. The double slot 49 is a releasable rout 37 that is compatible with the clip locks 1 illustrated in FIGS. 5-8 and FIGS. 13-16. The clip lock 1 is pushed into the keyway 45 of the double slot 49 located on a panel 34. The double slot 49 can have the router bit hole 35 or not have the router bit hole 35. The mating panel 34 comprises a double slot 49 and the keyway 45 portion is aligned with the portion of the clip lock 1 that is exposed. Once the keyway 45 of the mating panel 34 is aligned with the exposed portion of the clip lock 1, the mating panel 34 is pushed down to connect the panels 34 together. The clip lock 1 can also fasten panels 34 and substrates together by inserting the clip lock 1 into the insertion/release slot 43 and then aligning the insertion/release slot 43 of the mating panel to the exposed portion of the clip lock 1. Once the panels 34 are aligned, then the user pushes the panels 34 in opposing directions until the clip lock 1 slides into the keyway 45 and connects the two panels 34 together.

FIG. 35A illustrates two panels assembled and secured with the releasable clip lock, according to an embodiment of the present invention. There are two panels 34 connected to each other by the clip lock 1 as the clip lock 1 is snapped in the keyway 45 of each double slot 49. The insertion/release slots 43 of both panels 34 are empty because the clip lock 1 is occupying the keyway 45. FIGS. 35B-35D illustrate a panel disassembly with the releasable clip lock 1, according to an embodiment of the present invention. To disassemble the fastening system, the user slides both mating panels 34 in opposing directions towards the insertion/release slot 43, as shown in FIG. 35B. When this occurs, the keyway 45 slides away from the clip lock 1 and the hook undercut 24 slides from under the undercut 25 of the clip hook 26. FIG. 35C and FIG. 35D illustrate that once the clip lock 1 is in the insertion/release slot 43, the top panel 34 can be removed, then the bottom panel 34 can also be removed without damaging the substrate or panel 34 or clip lock and can therefore be reconnected as before.

Figure 36:
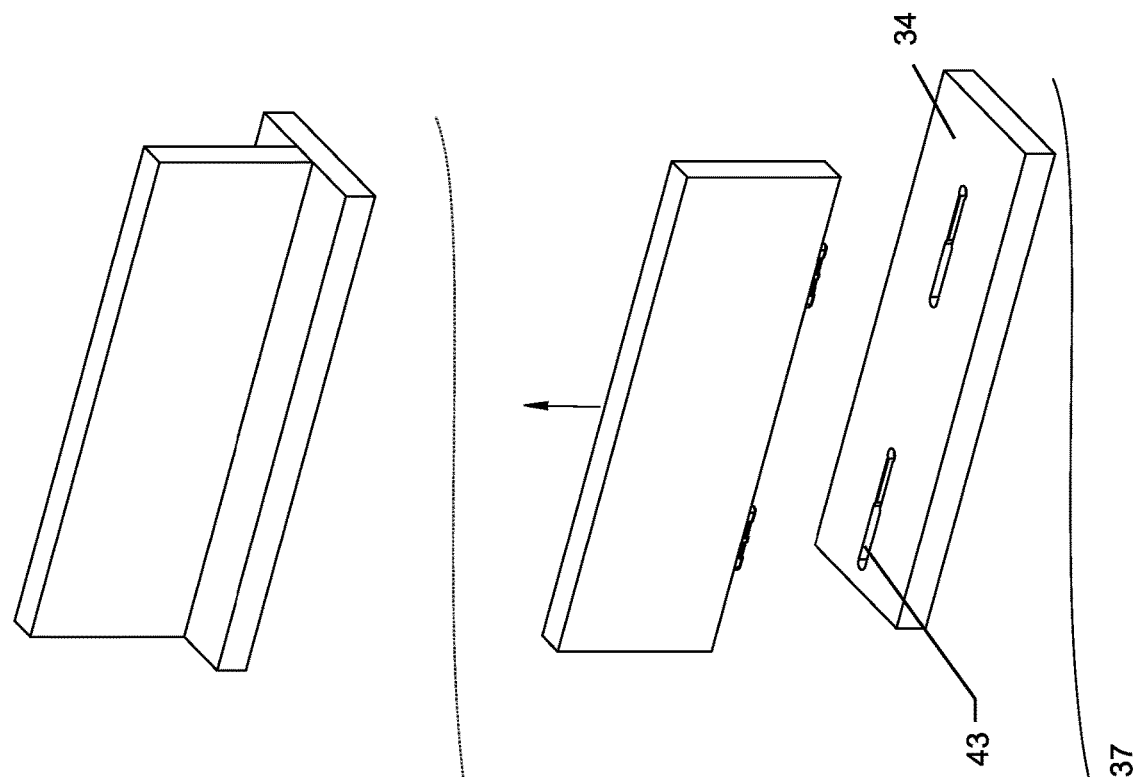
FIG. 36 illustrates a perspective view panel assembly with the releasable barbed clip locks, according to an embodiment of the present invention.

FIG. 36 illustrates a panel assembly with the releasable barbed clip locks 2, according to an embodiment of the present invention having barbed post holes 47 drilled on the edge of a panel 34 (not shown, see FIG. 24). The barbed clips locks 2 compatible with this releasable barbed clip lock 2 system are the embodiments shown in FIGS. 13-16. Once the barbed clip lock 2 are inserted into the barbed post holes 47, a mating panel 34 having a double slot 49 is aligned with the exposed portion of the barbed clip lock 2. The barbed clip lock 2 is pushed into the keyway 45 of the double slot 49 located on a mating panel 34. The double slot 49 can have the router bit hole 35 or not have the router bit hole 35. The barbed clip lock 2 can also fasten panels 34 and substrates together by inserting the exposed portion of the barbed clip lock 2 into the insertion/release slot 43 and then pushing the panel 34 into the keyway 45 of the mating panel 34.

Figure 37:
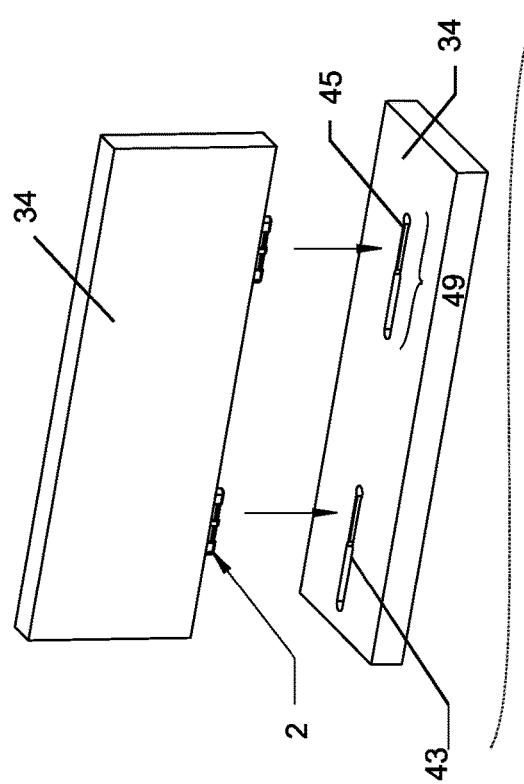
FIG. 37 illustrates a perspective view panel disassembly with the releasable barbed clip locks, according to an embodiment of the present invention.

FIG. 37 illustrates a panel disassembly with the releasable barbed clip locks 2, according to an embodiment of the present invention. To disassemble the fastening system, the panel 34 having the barbed post holes 47 is slid towards the insertion/release slot 43, then the panel 34 is lifted and released.

Figure 38:
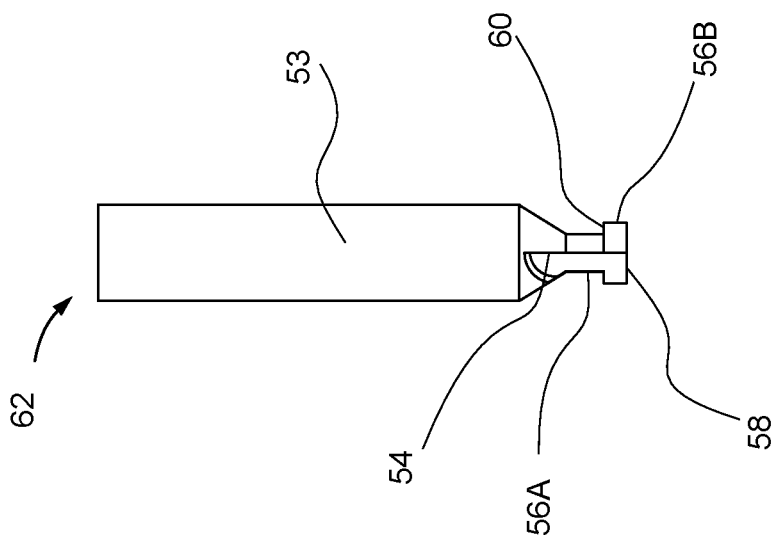
FIG. 38 illustrates a side view of the router bit, according to an embodiment of the present invention.

FIG. 38 illustrates a side view of the router bit 62, according to an embodiment of the present invention comprising a shank 53, chamfer cutter 54, slot cutting edge 56A and 56B, plunge cutting edge 58, and retract cutting edge 60. There are four cutting edges, the plunge cutting edge 58, chamfer cutter 54 and retract cutting edge 60, slot cutting edge 56.

The following routing description applies to the permanent rout 37. The plunge cutting edge 58 can plunge cut a hole into the face of a panel 34 by moving about 90 degrees down towards the face and rotating clock-wise as it plunges. Once the router bit 62 reaches the appropriate depth, the slot cutting edge 56A, slot cutting edge 2 56B start as the router bit 62 moves horizontally along the panel 34 creating the rout 37. This step also creates the chamfer edges along the rout 37. Once the router bit 62 reaches the appropriate length, it retracts upward away from the panel 34 as the retract cutting edge 60 creates a smooth hole 39 up through the surface. This retract cutting edge 60 prevents the panel 34 from chipping and thus destroying the rout 37. The shank 53 provides the router bit 62 structure and support and is about 0.5 inches in diameter which is the end that is clamped into a router collet. The slot cutting edge 56A and 56B are the cutting edges that remove material of the substrate as the router bit 62 moves horizontally while cutting the rout 37 and creating the undercut 25 and center support slot 52 of the clip lock.

For routing the double slot 49, the chamfer cutter 54 chamfers the edges of the keyway 45 to create the insertion chamfer 51. The plunge cutting edge 58 can plunge cut a hole into the face of a panel 34 by moving about 90 degrees down towards the face and rotating clock-wise as it plunges. Once the router bit 62 reaches the appropriate depth, the routing starts as the router bit 62 moves horizontally along the panel 34 creating the rout 37. The slot cutting edge 56A routs the undercut 25 of the double slot 49. The slot cutting edge 56B also routs the insertion/release slot 43 of the double slot 49. Once the router bit 62 reaches the appropriate length, it retracts upward away from the panel 34. The router bit 62 is used to rout all the above mentioned routs 37. The router bit 62 can be made from high speed steel or solid carbide. It can also be carbide tipped or diamond tipped.

Figure 39:
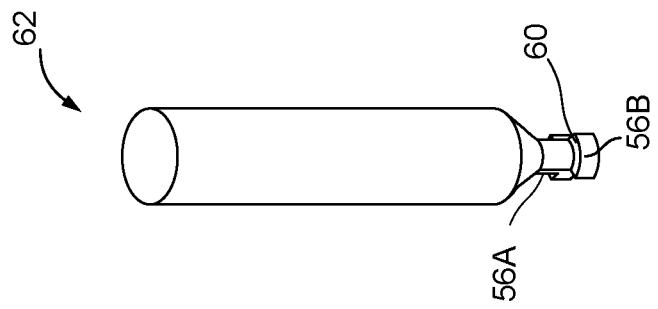
FIG. 39 illustrates a perspective view of the router bit, according to an embodiment of the present invention.
Figure 40C:
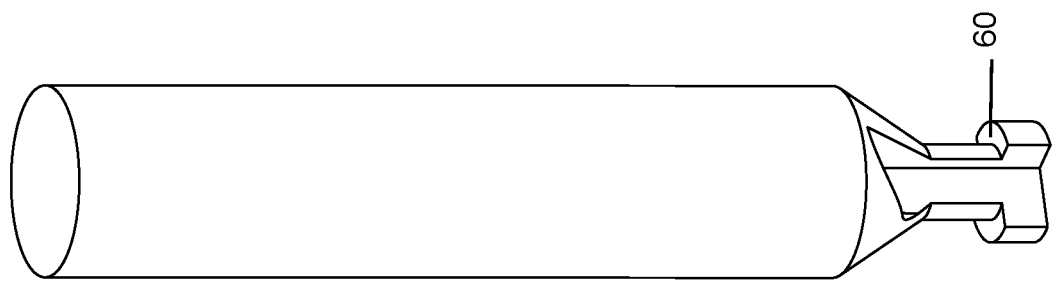
FIGS. 40A-40C illustrate various view of the router bit, according to an embodiment of the present invention.
Figure 40B:
Figure 40A:
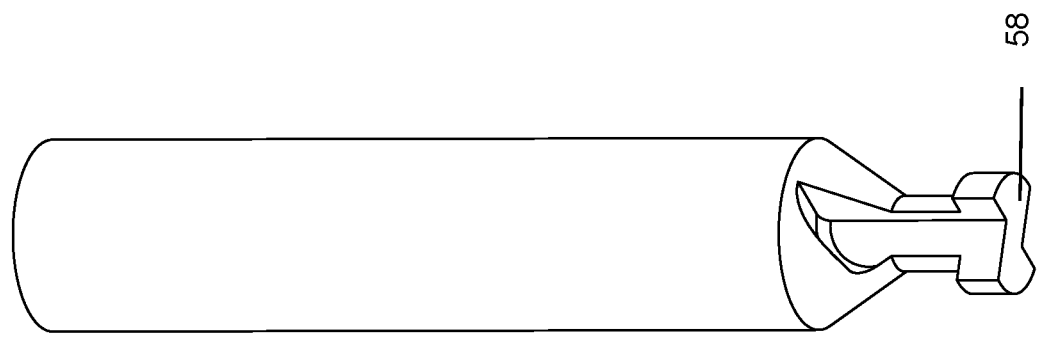

FIG. 39 illustrates a perspective view of the router bit 62, according to an embodiment of the present invention illustrating the router bit 62 having a cylindrical shape. It also shows a direct view of the retract cutting edge 60 and the slot cutting edge 56B. FIG. 40A further illustrates a bottom perspective view the router bit 62 having a plunge cutting edge 58. FIG. 40B further illustrates a side view the router bit 62 having chamfer cutter 54, slot cutting edge 56A, and a slot cutting edge 2 56B. FIG. 40C further illustrates a top perspective view of the router bit 62 having a retract cutting edge 60.

According to embodiments of the present invention, the embodiments of the fasteners described herein may have a pull force of about 100 pounds and a sheer force of over 100 pounds. However, other forces are possible as the pull force and sheer force may change depending on the material of the substrate or panel 34. While the embodiments described above include specific dimensions, it will be understood that many other sizes and dimensions of the clip lock 1 and barbed clip lock 2 can be used in conjunction with the fastening system, panels 34 and substrates. In embodiments of the present invention, the fastener comprises a symmetrically formed solid body. In embodiments, the body is made of a solid polymeric material or a non-metal material. In other embodiments, the body is made of solid metallic material.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:
1. A fastener comprising:
   a body having a first surface opposing a parallel second surface, a first face opposing a parallel second face, the first and second faces substantially perpendicular to the first and second surfaces, each of the first and second surfaces connecting to a first end post and an opposing second end post;

19 a center support section located between the first end post and the second end post, and coupled to the first end post and the second end post;

one or more pairs of compressible clips formed on the center support section, wherein one clip protrudes from the first surface and an opposing clip protrudes from the second surface, and the one or more pair of compressible clips located an equal distance away from the first face.

2. The fastener of claim 1, wherein the body is symmetrically formed and further comprises a second pair of compressible clips located an equal distance away from the second face, and opposite an at least first pair of compressible clips.

3. The fastener of claim 2, wherein each clip comprises a hook having a triangular profile along a cross-section, such that each clip of the first pair of compressible clips protrudes away from the center support section with a flat surface parallel to the first face, and with an inclined surface tapering toward the first face; and such that each clip of the second pair of compressible clips protrudes away from the center support section with a flat surface parallel to the second face, and with an inclined surface tapering toward the second face.

4. The fastener of claim 1, wherein each clip comprises a substantially triangular profile hook along a cross-section, such that each clip protrudes away from the center support section with an inclined surface tapering toward the first face.

5. The fastener of claim 1, further comprising an internal deflection space inside the center support section between an at least first pair of compressible clips, wherein the deflection space is bounded by a cantilever arm formed on a first surface side and a second surface side, each cantilever arm deflects into the deflection space when pressure is applied to the at least first pair of compressible clips.

6. The fastener of claim 1, further comprising at least a second pair of compressible clips positioned along a same elevation as the first pair of compressible clips, the first pair and the second pair of compressible clips divided by a center post on the center support section.

7. The fastener of claim 1, wherein at least the first face comprises a chamfered edge.

8. The fastener of claim 1, wherein the first end post and second end post each comprises a plurality of barbed edges along a portion of an outer surface of the respective end members.

9. The fastener of claim 1, wherein the first end post and second end post each extend out perpendicularly from the second face at a distance past the center support section.

10. The fastener of claim 9, wherein the first end post and second end post each comprises a plurality of barbed edges along a portion of an outer surface of the respective end posts near the first face.

11. The fastener of claim 9, wherein each post comprises a plurality of barbed edges located on a portion of an outer surface of each post.

12. The fastener of claim 9, wherein each post comprises a substantially cylindrical form and comprises a chamfered edge along an outer diameter nearest a terminating end face of the post.

13. A fastening system comprising:

a fastener body having a first surface opposing a parallel second surface, a first face opposing a parallel second face, the first and second faces perpendicular to the first and second surfaces, each of the first and second surfaces connecting to a first end post and an opposing second end post;

a center support section located between the first end post and the second end post, and coupled to the first end post and the second end post;

at least a first pair of compressible clips formed on the center support section, wherein one clip protrudes from the first surface and an opposing clip protrudes from the second surface, and the at least first pair of compressible clips located an equal distance away from the first face; and a substrate defining a slot formed into a surface of a substrate comprising a first end, a second end, and a depth configured with at least two different depth sections to correspondingly receive the compressible clips, such that the compressible clips are compressible in response to being initially inserted into the slot through a first depth section and then the compressible clips are expandable to lock the fastener body in place to the substrate in response to the compressible clips being received into a second depth section.

14. The fastening system of claim 13, wherein a width of the first depth section transitions at substantially a right angle to a width of the second depth section on opposing sides of the slot, forming an undercut surface of the substrate to engage the at least first pair of compressible clips when received into the second depth section.

15. The fastening system of claim 13, wherein at least the first face of the fastener body comprises a chamfered edge; and the depth of the slot further comprising a third depth section defining an insertion chamfer for initially receiving the fastener body at the chamfered edge of the first face.

16. The fastening system of claim 13, wherein the substrate defines the slot as a double slot comprising:

an insertion slot beginning from the first end and continuing into a keyway slot terminating at the second end; a width of the insertion slot being larger than a width of the keyway slot and configured to receive at least the first face of the fastener body, wherein the at least two depth sections are located within the keyway slot such that the keyway slot slidingly receives the fastener body from the insertion slot or slidingly releases the fastener body back into the insertion slot.

17. A method, comprising:

inserting a fastener into a substrate defining a slot formed into a surface of the substrate through a first depth section of the slot, wherein the fastener comprises a body having a first surface opposing a parallel second surface, a first face opposing a parallel second face, the first and second faces substantially perpendicular to the first and second surfaces, each of the first and second surfaces connecting to a first end post and an opposing second end post;

wherein the fastener comprises a center support section located between the first end post and the second end post, and coupled to the first end post and the second end post;

wherein the fastener comprises one or more pairs of compressible clips formed on the center support section, wherein one clip protrudes from the first surface and an opposing clip protrudes from the second surface, and the one or more pair of compressible clips located an equal distance away from the first face; and wherein the substrate defining the slot formed into the surface of the substrate comprises a first end, a second end, and a depth configured with at least the first depth section and a second depth section to correspondingly receive the compressible clips, such that the compressible clips are compressible in response to being initially inserted into the slot through the first depth section; and further inserting the fastener into the substrate defining the slot formed into the surface of the substrate into the second depth section of the slot, wherein the compressible clips are expandable to lock the fastener body in place to the substrate in response to the compressible clips being received into the second depth section.

18. The method of claim 17, wherein a width of the first depth section transitions at substantially a right angle to a width of the second depth section on opposing sides of the slot, forming an undercut surface of the substrate to engage the at least first pair of compressible clips when received into the second depth section.

19. The method of claim 17, wherein at least the first face of the fastener body comprises a chamfered edge, wherein the depth of the slot further comprising a third depth section defining an insertion chamfer for initially receiving the fastener body at the chamfered edge of the first face.

20. The method of claim 17, wherein the substrate defines the slot as a double slot comprising:

an insertion slot beginning from the first end and continuing into a keyway slot terminating at the second end; a width of the insertion slot being larger than a width of the keyway slot and configured to receive at least the first face of the fastener body, wherein the at least two depth sections are located within the keyway slot such that the keyway slot slidingly receives the fastener body from the insertion slot or slidingly releases the fastener body back into the insertion slot.

* * * * *